US011630462B2

(12) United States Patent
Lee et al.

(10) Patent No.: US 11,630,462 B2
(45) Date of Patent: Apr. 18, 2023

(54) MOVING ROBOT AND MOVING ROBOT SYSTEM

(71) Applicant: LG ELECTRONICS INC., Seoul (KR)

(72) Inventors: Jaehoon Lee, Seoul (KR); Kyuchun Choi, Seoul (KR); Jongjin Woo, Seoul (KR); Dongseong Kim, Seoul (KR); Hyungsub Kim, Seoul (KR); Seungin Shin, Seoul (KR); Kyungman Yu, Seoul (KR); Jaehoon Jeong, Seoul (KR); Dongkyun Nam, Seoul (KR); Jongil Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 17/045,552

(22) PCT Filed: Apr. 5, 2019

(86) PCT No.: PCT/KR2019/004058
§ 371 (c)(1),
(2) Date: Oct. 6, 2020

(87) PCT Pub. No.: WO2019/194632
PCT Pub. Date: Oct. 10, 2019

(65) Prior Publication Data
US 2021/0157327 A1 May 27, 2021

Related U.S. Application Data

(60) Provisional application No. 62/653,567, filed on Apr. 6, 2018.

(30) Foreign Application Priority Data

Apr. 5, 2019 (KR) .......................... 10-2019-0040039

(51) Int. Cl.
G05D 1/02 (2020.01)
A01D 34/00 (2006.01)
(Continued)

(52) U.S. Cl.
CPC ......... *G05D 1/0219* (2013.01); *A01D 34/008* (2013.01); *B60L 53/16* (2019.02);
(Continued)

(58) Field of Classification Search
CPC . A01D 34/008; A01D 2101/00; B25J 9/1664; B25J 9/1684; B25J 11/00;
(Continued)

(56) References Cited

U.S. PATENT DOCUMENTS

2004/0193349 A1* 9/2004 Flann .................. G05D 1/0274
701/50
2005/0113990 A1* 5/2005 Peless ................. G05D 1/0219
701/532
(Continued)

FOREIGN PATENT DOCUMENTS

CN 102920393 A * 2/2013 ............... A47L 1/02
KR 10-2008-0090925 10/2008
(Continued)

OTHER PUBLICATIONS

English Translation of CN-102920393-A, Accessed Mar. 25, 2022, Obtained from PE2E.*
(Continued)

*Primary Examiner* — Jeff A Burke
*Assistant Examiner* — Blake A Wood
(74) *Attorney, Agent, or Firm* — Birch, Stewart, Kolasch & Birch, LLP

(57) ABSTRACT

The present disclosure provides a moving robot including a body which forms an appearance, a traveler which moves the body, a boundary signal detector which detects a bound-
(Continued)

ary signal generated in a boundary area of a traveling area, and a controller which controls a traveler so that the traveler performs pattern traveling a plurality of times in the traveling area, and controls the traveler so that a traveling angle during first pattern traveling and a traveling angle during second pattern traveling are different from each other. Accordingly, when the pattern traveling is performed a plurality of times, the pattern traveling is performed at angles different from each other based on a reference axis, and it is possible to minimize an area which cannot be mowed and improve efficiency.

12 Claims, 19 Drawing Sheets

(51) Int. Cl.
| | | |
|---|---|---|
| | *G05D 1/00* | (2006.01) |
| | *B60L 53/36* | (2019.01) |
| | *B60L 53/16* | (2019.01) |
| | *A01D 101/00* | (2006.01) |
| | *B60W 60/00* | (2020.01) |

(52) U.S. Cl.
CPC ............ *B60L 53/36* (2019.02); *G05D 1/0038* (2013.01); *G05D 1/0088* (2013.01); *G05D 1/0214* (2013.01); *G05D 1/0225* (2013.01); *G05D 1/0259* (2013.01); *G05D 1/0276* (2013.01); *A01D 2101/00* (2013.01); *B60L 2200/40* (2013.01); *B60W 60/0025* (2020.02); *G05D 2201/0208* (2013.01); *G05D 2201/0215* (2013.01)

(58) Field of Classification Search
CPC ......... B25J 19/005; B60L 53/16; B60L 53/36; B60L 2200/40; B60W 60/0025; G05D 1/0038; G05D 1/0088; G05D 1/0214; G05D 1/0219; G05D 1/0225; G05D 1/0259; G05D 1/0276; G05D 2201/0208; G05D 2201/0215; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 2008/0249661 A1* | 10/2008 | Hong | A47L 9/009 901/1 |
| 2009/0228166 A1* | 9/2009 | Durkos | G05D 1/0246 701/26 |
| 2010/0313364 A1* | 12/2010 | Chung | B25J 9/1664 15/4 |
| 2011/0202175 A1 | 8/2011 | Romanov et al. | |
| 2012/0029756 A1* | 2/2012 | Johnson | G05D 1/0265 701/26 |
| 2012/0290165 A1 | 11/2012 | Ouyang | |
| 2014/0100736 A1* | 4/2014 | Kim | G05D 1/0219 15/49.1 |
| 2016/0113195 A1* | 4/2016 | Das | G05D 1/0225 701/25 |
| 2019/0278291 A1* | 9/2019 | Ebrahimi Afrouzi | B25J 9/0003 |
| 2021/0112708 A1* | 4/2021 | Kameyama | B60W 10/04 |

FOREIGN PATENT DOCUMENTS

| | | |
|---|---|---|
| KR | 10-2009-0104385 | 10/2009 |
| KR | 10-2010-0133884 | 12/2010 |
| KR | 10-2013-0137995 | 10/2013 |
| KR | 10-2016-0128123 | 11/2016 |

OTHER PUBLICATIONS

PCT International Search Report issued in Application No. PCT/KR2019/004058 dated Aug. 5, 2019 (3 pages).
Office Action issued in Australian Application No. 2019248258, dated Sep. 30, 2021 (7 pages).
Search Report issued in European Application No. 19781299.3-1202, dated Oct. 1, 2021 (9 pages).

* cited by examiner

MOVING ROBOT AND MOVING ROBOT SYSTEM

BACKGROUND OF THE DISCLOSURE

Technical Field

The present disclosure relates to a moving robot and a moving robot system which performs traveling by changing an angle for a plurality of times of traveling during pattern traveling of the moving robot.

Background Information

A robot has been developed for industrial use and has been responsible for a portion of factory automation. In recent years, a field of application of the robot has been further expanded, a medical robot, an aerospace robot, or the like has been developed, and a home robot that can be used in a general home is also manufactured. Among these robots, a robot capable of traveling by itself is called a moving robot. A typical example of the moving robot used in an outdoor environment of a home is a lawn mowing robot.

In a case of a moving robot autonomously traveling indoors, a movable area is limited by a wall or furniture, but in a case of a mobile robot autonomously traveling outdoors, there is a need to set a movable area in advance. In addition, there is a need to limit the movable area so that the lawn mowing robot travels in an area where grass is planted.

In the related art (United State Patent Publication No. US20170344012A1), a moving robot is disclosed which changes a direction thereof whenever encounters a set boundary point and randomly travels. Moreover, in the related art (Korean Patent Publication Laid-Open No. 2015-0125508), a wire is buried to set an area in which a lawn mower robot is to be moved, and the lawn mower robot senses a magnetic field formed by a current flowing through the wire and can move within an area set by the wire.

Further, according to the related art, a traveling method is disclosed in which pattern traveling is performed using one point of a wire as a starting point. In one area, the pattern driving is performed a plurality of times, and lawn mowing is sequentially performed accordingly.

However, in a case of performing the pattern traveling as described above, since all the traveling in the same direction is performed, an area wherein the lawn cannot be mowed occurs due to a shape of the boundary wire and a driving area division algorithm of the moving robot.

As in the related art, if the lawn mower robot is continuously traveled at a fixed specific angle when the pattern traveling is performed a plurality of times, the areas where the lawn cannot be mowed are overlapped a plurality of times, and thus, a gap increases when compared with the mowed areas.

SUMMARY

A first object of the present disclosure is to minimize an area which cannot be mowed, by performing at different angles with respect to a reference axis when the pattern traveling is performed a plurality of times.

A second object of the present disclosure is to minimize the area which cannot be mowed, by changing the angle within a maximum of 45° when the angle is sequentially changed a plurality of times and changing the angle to not a redundant angle but a slight deflection angle.

A third object of the present disclosure is to provide a traveling method capable of increasing intimacy with a user by reflecting a point of view of the user in a traveling area in traveling of a lawn mower robot to control the traveling angle, and performing lawn mowing to reflect a life pattern of the user.

A fourth object of the present disclosure is to provide a method of providing information so that a user can directly set a traveling angle through a terminal of the user and receiving a command, and controlling the traveling angle according to the command.

According to an aspect of the present disclosure, there is provided a moving robot including: a body which forms an appearance; a traveler which moves the body; a boundary signal detector which detects a boundary signal generated in a boundary area of a traveling area; and a controller which controls a traveler so that the traveler performs pattern traveling a plurality of times in the traveling area, and controls the traveler so that a traveling angle during first pattern traveling and a traveling angle during second pattern traveling are different from each other.

The controller may control the traveler so that the traveler performs pattern traveling in a zigzag mode in which the moving robot alternately travels a major axis and a minor axis.

The controller may define a traveling angle of the major axis with respect to a reference line of the traveling area as the traveling angle, and angles of the first pattern traveling and the second pattern traveling may be different from each other.

The controller may set the traveling angles of the first pattern traveling and the second pattern traveling so that the traveling angles are shifted by the same angle in directions different from each other with respect to the reference line.

The shifted traveling angle may be 1° to 90°.

The traveling angle may be 1° to 10°.

The traveling angle may be shifted to increase by the same angle according a plurality of times of pattern traveling.

The controller may shift the traveling angle by 15° according to the pattern traveling.

The controller may set angles of the minor axis and the major axis according to the traveling angle of a new major axis.

The controller may set the traveling angle according to information on a structure other than the traveling area.

The controller may set the traveling angle according to directions of a window and a main door of an inner space.

The controller may set the traveling angle so that, during the last pattern traveling, the moving robot travels an area, in which the moving robot travels equal to or less than a critical count, of traveling areas up to a previous pattern traveling.

Meanwhile, according to another aspect of the present disclosure, there is provided a moving robot system including: a boundary wire which defines a traveling area; a moving robot which includes a body which forms an appearance, a traveler which moves the body, a boundary signal detector which detects a boundary signal generated in a boundary area of a traveling area, and a controller which controls a traveler so that the traveler performs pattern traveling a plurality of times in the traveling area, and controls the traveler so that a traveling angle during first pattern traveling and a traveling angle during second pattern traveling are different from each other; and a user terminal which transmits information on the traveling angle to the moving robot.

The controller may control the traveler so that the traveler performs pattern traveling in a zigzag mode in which the moving robot alternately travels a major axis and a minor axis.

An application for the moving robot may be stored in the user terminal.

The controller may transmit map information on the traveling area to the user terminal.

The map information may visually indicate information on a structure other than the traveling area.

The moving robot system may further include a docking device to which the moving robot is docked to be charged, and one end of the boundary area may be disposed to be adjacent to the docking device.

The docking device may further include a first wire terminal and a second wire terminal connected to a power source, and one end of the boundary wire may be connected to the first wire terminal and the other end of the boundary wire may be connected to the second wire terminal.

According to the present disclosure, it is possible to minimize an area which cannot be mowed, by performing traveling at different angles with respect to a reference axis when the pattern traveling is performed a plurality of times.

According to the present disclosure, it is possible to minimize the area which cannot be mowed, by changing the angle within a maximum of 45° when the angle is sequentially changed a plurality of times and changing the angle to not a redundant angle but a slight deflection angle.

Moreover, according to the present disclosure, it is possible to increase intimacy with a user by reflecting a point of view of the user in a traveling area to control the traveling angle, and performing lawn mowing to reflect a life pattern of the user.

In addition, according to the present disclosure, it is possible to provide a moving robot capable of providing information so that the user can directly set the traveling angle through a terminal of the user and receiving a command to perform the traveling at an angle which best suits an intention of the user.

DESCRIPTION OF EXEMPLARY EMBODIMENTS

Figure 1:
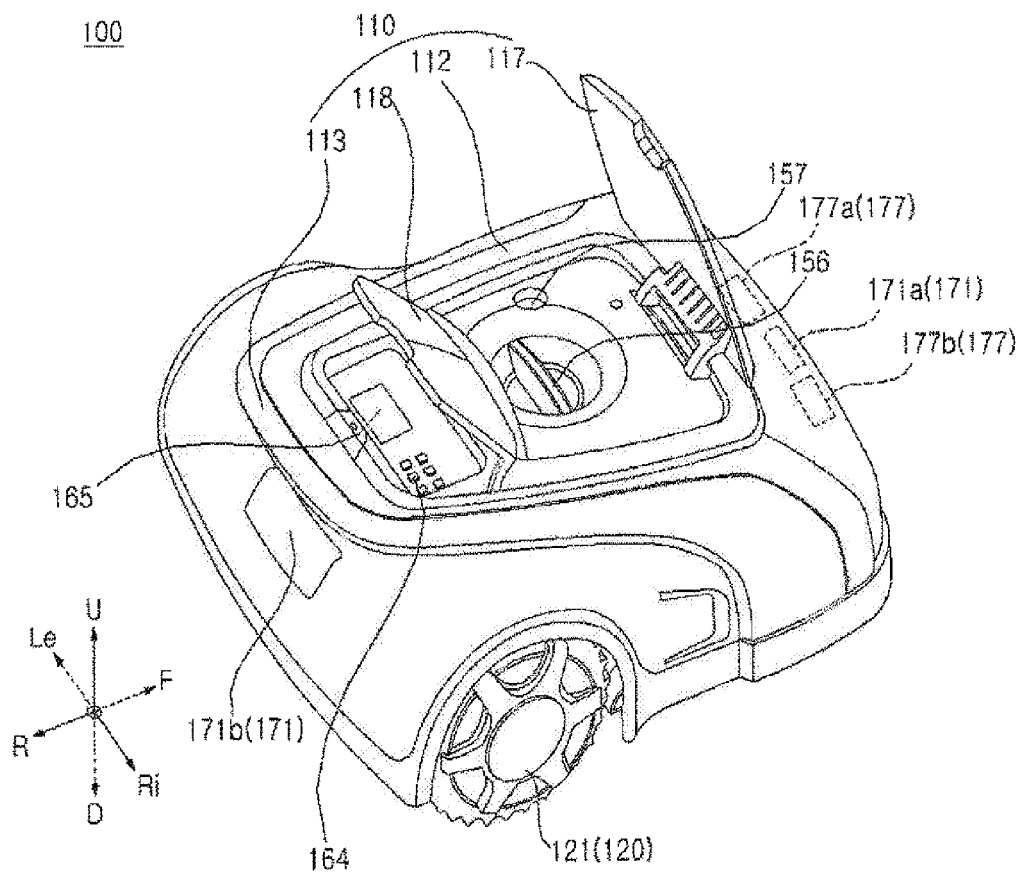
FIG. 1 is a perspective view illustrating a moving robot 100 according to an embodiment of the present disclosure.
Figure 2:
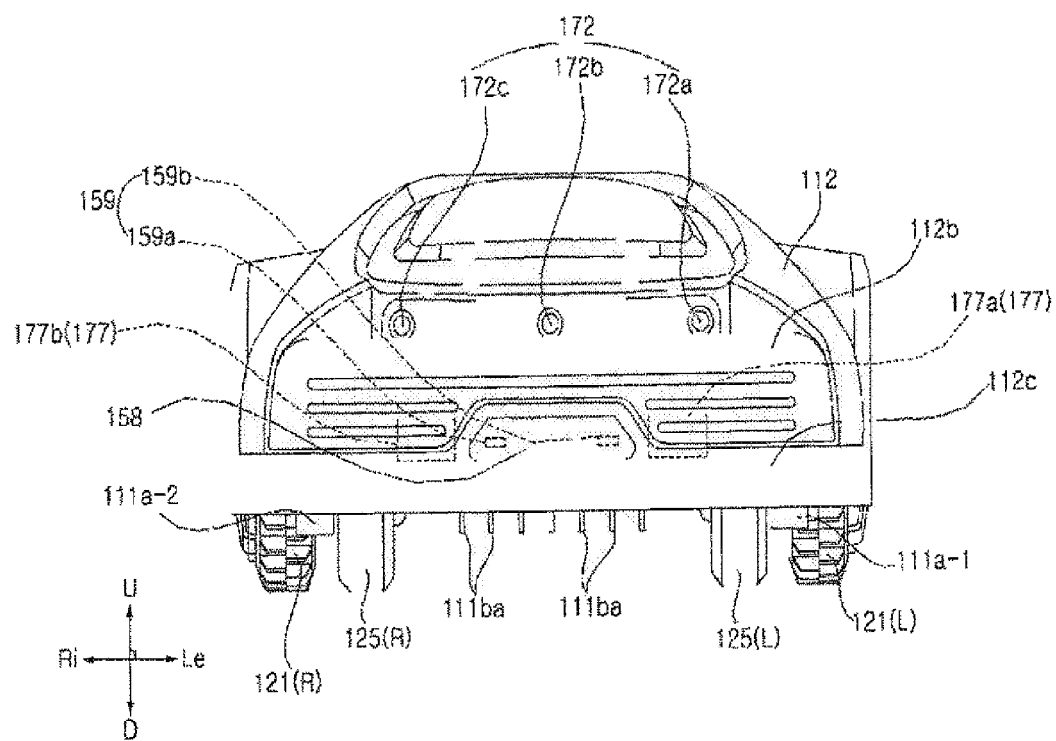
FIG. 2 is an elevational view when viewing a front surface of the moving robot of FIG. 1.
Figure 3:
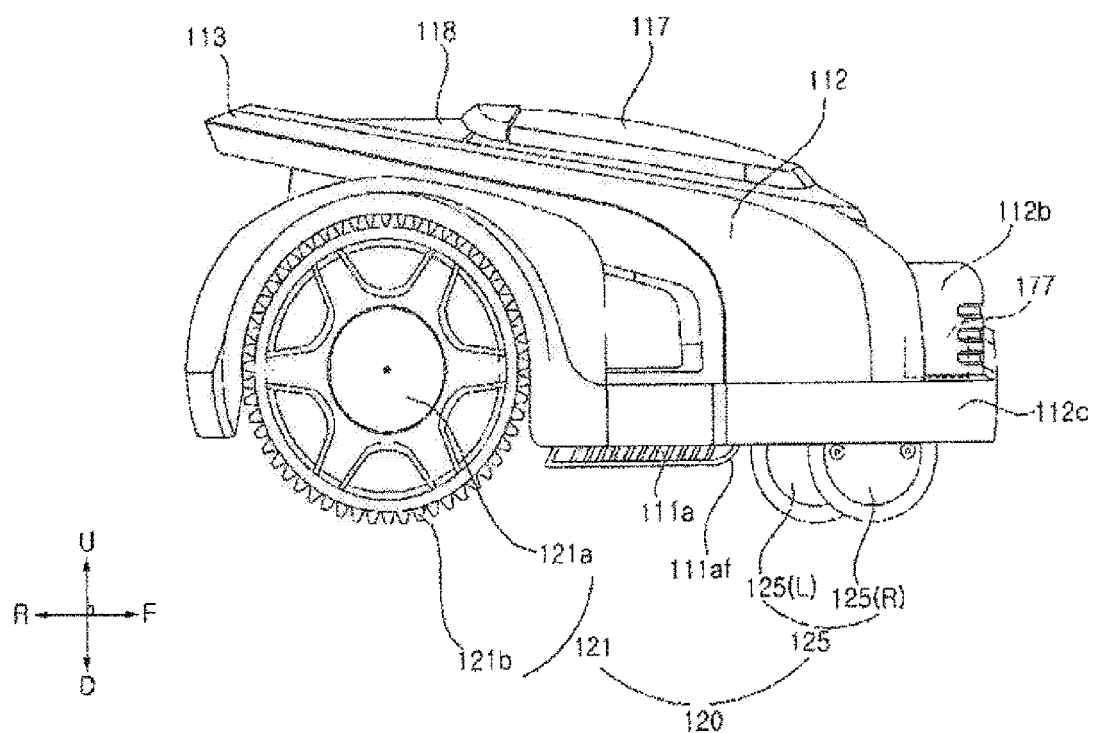
FIG. 3 is an elevational view when viewing a right surface of the moving robot of FIG. 1.
Figure 4:
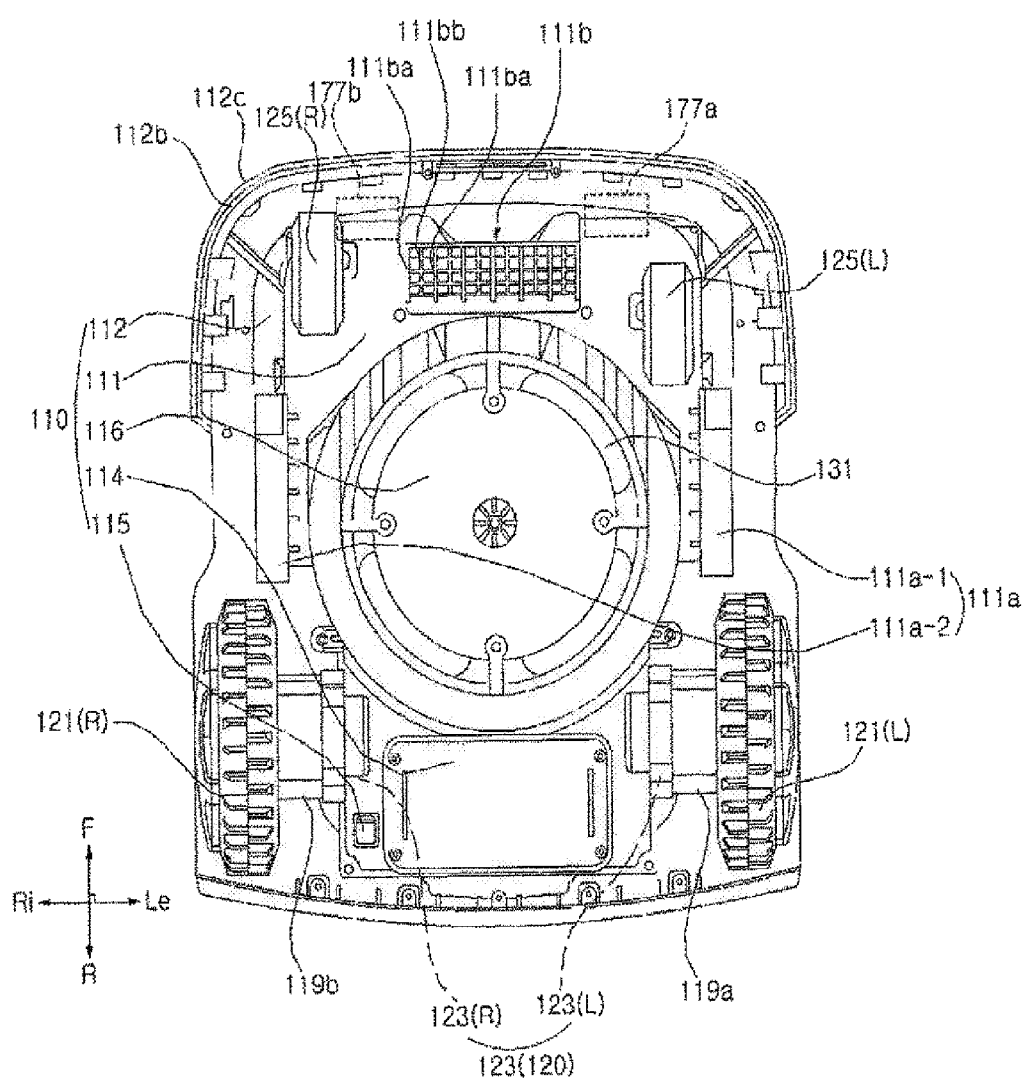
FIG. 4 is an elevational view when viewing a bottom surface of the moving robot of FIG. 1.

Expressions referring to directions such as "front(F)/rear (R)/left(Le)/right(Ri)/up (U)/down (D)" mentioned below are defined as indicated in the drawings. However, the expressions are only to explain the present disclosure so that the present disclosure can be clearly understood, and the directions may be differently defined depending on a criterion.

Use of terms "first and second" in front of components mentioned below is only to avoid confusion of the referred component, and is independent of an order, importance, or master/slave relationship between the components. For example, an embodiment including only a second component without a first component can be implemented.

In the drawings, a thickness or a size of each component is exaggerated, omitted, or schematically illustrated for convenience and clarity of the explanation. The size and area of each component do not entirely reflect the actual size or area.

Moreover, an angle and a direction mentioned in describing a structure of the present disclosure are based on those described in the drawings. In description of a structure in the specification, if a reference point and a positional relationship with respect to the angle are not explicitly mentioned, reference is made to the related drawings.

Hereinafter, a lawn mowing robot 100 of moving robots will be described as an example with reference to FIGS. 1 to 6, but the present disclosure is not limited thereto.

Referring to FIGS. 1 to 4, the moving robot 100 includes a body 110 which forms an appearance. The body 110 forms an interior space. The moving robot 100 includes a traveler 120 which moves the body 110 with respect to a traveling surface. The moving robot 100 includes an operator 130 which performs a predetermined work.

The body 110 includes a frame 111 to which the driving motor module 123 to be described later is fixed. A blade motor 132 to be described later is fixed to the frame 111. The frame 111 supports a battery to be described later. The frame 111 provides a skeleton structure which supports various other parts. The frame 111 is supported by an auxiliary wheel 125 and a driving wheel 121.

The body 110 includes a side blocking portion 111a for preventing a finger of a user from entering a blade 131 from both sides of the blade 131. The side blocking portion 111a is fixed to the frame 111. The side blocking portion 111a is disposed to protrude downward compared to a bottom surface of the other portion of the frame 111. The side blocking portion 111a is disposed to cover an upper portion of a space between the driving wheel 121 and the auxiliary wheel 125.

A pair of side blocking portions 111a-1 and 111a-2 are disposed right and left with the blade 131 therebetween. The side blocking portion 111a is disposed to be spaced apart at a predetermined distance from the blade 131.

A front surface 111af of the side blocking portion 111a is formed to be round. The front surface 111af forms a surface which is bent upward to be rounded forward from a bottom surface of the side blocking portion 111*a*. By using the shape of the front surface 111*af*, when the moving robot 100 moves forward, the side blocking portion 111*a* can easily ride over a lower obstacle below a predetermined reference.

The body 110 includes a front blocking portion 111*b* for preventing the finger of the user from entering the blade 131 in front of the blade 131. The front blocking portion 111*b* is fixed to the frame 111. The front blocking portion 111*b* is disposed to cover a portion of an upper portion of a space between the pair of auxiliary wheels 125L and 125R.

The front blocking portion 111*b* includes a protruding rib 111*ba* protruding downward compared to a bottom surface of the other portion of the frame 111. The protruding rib 111*ba* extends in a front-rear direction. An upper end portion of the protruding rib 111*ba* is fixed to the frame 111, and a lower end portion of the protruding rib 111*ba* forms a free end.

A plurality of protruding ribs 111*ba* may be spaced apart in a right-left direction. The plurality of protruding ribs 111*ba* may be disposed parallel to each other. A gap is formed between two adjacent protruding ribs 111*ba*.

A front surface of the protruding rib 111*ba* is formed to be round. The front surface of the protruding rib 111*ba* forms a surface which is bent upward to be rounded forward from a bottom surface of the protruding rib 111*ba*. By using the shape of the front surface of the protruding rib 111*ba*, when the moving robot 100 moves forward, the protruding rib 111*ba* 111*a* can easily ride over a lower obstacle below a predetermined reference.

The front blocking portion 111*b* includes an auxiliary rib 111*bb* to assist stiffness. The auxiliary rib 111*bb* for reinforcing stiffness of the front blocking portion 111*b* is disposed between upper end portions of the two adjacent protruding ribs 111*ba*. The auxiliary rib 111*bb* may be formed to protrude downward and extend in a lattice shape.

A caster (not illustrated) for rotatably supporting the auxiliary wheel 125 is disposed on the frame 111. The caster is rotatably disposed with respect to the frame 111. The caster is rotatably provided about a vertical axis. The caster is disposed below the frame 111. A pair of casters corresponding to the pair of auxiliary wheels 125 is provided.

The body 110 includes a case 112 which covers the frame 111 from above. The case 112 forms an upper surface and front/rear/left/right surfaces of the moving robot 100.

The body 110 may include a case connector (not illustrated) which fixes the case 112 to the frame 111. The case 112 may be fixed to an upper end of the case connector. The case connector may be disposed to be movable in the frame 111. The case connector may be disposed to be movable only in an up-down direction with respect to the frame 111. The case connector may be provided to be able to be movable only within a predetermined range. The case connector is movable integrally with the case 112. Accordingly, the case 112 is movable relative to the frame 111.

The body 110 includes a bumper 112*b* disposed in a front portion thereof. The bumper 112*b* absorbs an impact when the bumper 112*b* comes in contact with an external obstacle. In a front surface portion of the bumper 112*b*, a bumper groove is formed, which is recessed rearward and formed to be elongated in the right-left direction. A plurality of bumper grooves may be disposed spaced apart in the up-down direction. A lower end of the protruding rib 111*ba* is disposed at a lower position than a lower end of the auxiliary rib 111*bb*.

In the bumper 112*b*, a front surface and right and left surfaces are formed to be connected to each other. The front surface and the side surfaces of the bumper 112*b* are connected to each other to be rounded.

The body 110 may include a bumper auxiliary portion 112*c* which is disposed to surround an outer surface of the bumper 112*b*. The bumper auxiliary part 112*c* is coupled to the bumper 112*b*. The bumper auxiliary portion 112*c* surrounds a lower portion and lower portions of right and left sides of a front surface of the bumper 112*b*. The bumper auxiliary portion 112*c* may cover the front surface and lower half portions of the right and left sides of the bumper 112*b*.

A front end surface of the bumper auxiliary portion 112*c* is disposed in front of a front end surface of the bumper 112*b*. The bumper auxiliary portion 112*c* forms a surface protruding from a surface of the bumper 112*b*.

The bumper auxiliary portion 112*c* may be formed of a material which is advantageous for shock absorption, such as rubber. The bumper auxiliary part 112*c* may be formed of a flexible material.

The frame 111 may include a movable fixing portion (not illustrated) to which the bumper 112*b* is fixed. The movable fixing portion may be disposed to protrude upward from the frame 111. The bumper 112*b* may be fixed to an upper end portion of the movable fixing portion.

The bumper 112*b* may be disposed to be movable within a predetermined range with respect to the frame 111. The bumper 112*b* is fixed to the movable fixing portion and can move integrally with the movable fixing portion.

The movable fixing portion may be disposed to be movable with respect to the frame 111. The movable fixing portion may be provided so that the movable fixing portion is rotatable within a predetermined range with respect to the frame 111 about a virtual rotation axis. Accordingly, the bumper 112*b* may be rotatably provided integrally with the movable fixing portion with respect to the frame 111.

The body 110 includes a handle 113. The handle 113 may be disposed on a rear side of the case 112.

The body 110 includes a battery input portion 114 through which a battery is taken in or out. The battery input portion 114 may be disposed on a bottom surface of the frame 111. The battery input unit 114 may be disposed on a rear side of the frame 111.

The body 110 includes a power switch 115 for turning on/off power of the moving robot 100. The power switch 115 may be disposed on the bottom surface of the frame 111.

The body 110 includes a blade protector 116 which covers a lower side of a central portion of the blade 131. The blade protector 116 is provided so that a blade of a centrifugal portion of the blade 131 is exposed, but the central portion of the blade 131 is covered.

The body 110 includes a first opening/closing unit 117 which opens and closes a portion where a height adjuster 156 and a height display 157 are disposed. The first opening and closing portion 117 is hinged to the case 112 and is provided to enable opening and closing operations. The first opening/closing portion 117 is disposed on an upper surface of the case 112.

The first opening/closing portion 117 is formed in a plate shape, and covers upper sides of the height adjuster 156 and the height display 157 in a closed state.

The body 110 includes a second opening/closing unit 118 for opening and closing a portion where a display module 165 and an input unit 164 are disposed. The second opening/closing unit 118 is hinged to the case 112 and is provided to enable opening and closing operations. The second opening/closing portion 118 is disposed on the upper surface of the case 112. The second opening/closing unit 118 is disposed behind the first opening/closing unit 117.

The second opening/closing unit 118 is formed in a plate shape, and covers the display module 165 and the input unit 164 in a closed state.

An openable angle of the second opening/closing unit 118 is preset to be smaller than an openable angle of the first opening/closing unit 117. Accordingly, even in an open state of the second opening/closing unit 118, the user can easily open the first opening/closing unit 117, and the user can easily operate the height adjuster 156. In addition, even in the open state of the second opening/closing unit 118, the user can visually check a content of the height display 157.

For example, the openable angle of the first opening/closing unit 117 may be provided to be about 80 to 90° based on the closed state. For example, an openable angle of the second opening/closing unit 118 may be provided to be about 45 to 60° based on the closed state.

In the first opening/closing unit 117, a rear end thereof is raised upward with a front end thereof as a center, and thus, the first opening/closing unit 117 is opened. Moreover, in the second opening/closing unit 118, a rear end thereof is raised upward with a front end thereof as a center, and thus, the second opening/closing unit 118 is opened. Accordingly, the user can open and close the first opening/closing unit 117 and the second opening/closing unit 118 from a rear side of the lawn mowing robot 100, which is a safe area even when the lawn mowing robot 100 moves forward. In addition, the opening operation of the first opening/closing unit 117 and the opening operation of the second opening/closing unit 118 may be prevented from interfering with each other.

The first opening/closing unit 117 may be provided to be rotatable with respect to the case 112, about a rotation axis extending in the right-left direction on the front end of the first opening/closing unit 117. The second opening/closing unit 118 may be provided to be rotatable with respect to the case 112, about a rotation axis extending in a right-left direction on the front end of the second opening/closing unit 118.

The body 110 may include a first motor housing 119a accommodating a first driving motor 123(L) therein, and a second motor housing 119b accommodating the second driving motor 123(R) therein. The first motor housing 119a may be fixed to a left side of the frame 111, and the second motor housing 119b may be fixed to a right side of the frame 111. A right end of the first motor housing 119a is fixed to the frame 111. A left end of the second motor housing 119b is fixed to the frame 111.

The first motor housing 119a is formed in a cylindrical shape forming a height from side to side. The second motor housing 119b is formed in a cylindrical shape forming a height from side to side.

The traveler 120 includes a drive wheel 121 which is rotated by a driving force of the drive motor module 123. The traveler 120 may include at least one pair of drive wheels 121 which is rotated by the driving force of the drive motor module 123. The driving wheel 121 includes a first wheel 121(L) and a second wheels 121(R) provided on the left and right sides so as to be independently rotatable. The first wheel 121(L) is disposed on the left side, and the second wheel 121(R) is disposed on the right side. The first wheel 121(L) and the second wheel 121(R) are spaced apart from side to side. The first wheel 121(L) and the second wheel 121(R) are disposed on a lower rear side of the body 110.

The first wheel 121(L) and the second wheel 121(R) are provided to be rotatable independently so that the body 110 can rotate and move forward with respect to the ground. For example, when the first wheel 121(L) and the second wheel 121(R) rotate at the same rotational speed, the body 110 may move forward with respect to the ground. For example, when the rotational speed of the first wheel 121(L) is faster than the rotational speed of the second wheel 121(R) or when a rotational direction of the first wheel 121(L) and a rotational direction of the second wheel 121(R) are different from each other, the body 110 may rotate with respect to the ground.

The first wheel 121(L) and the second wheel 121(R) may be formed larger than the auxiliary wheel 125. A shaft of the first driving motor 123 (L) may be fixed to a center portion of the first wheel 121(L), and a shaft of the second driving motor 123(R) may be fixed to a center portion of the second wheel 121(R).

The driving wheel 121 includes a wheel outer peripheral portion 121b which is in contact with the ground. For example, the wheel outer portion 121b may be a tire. A plurality of protrusions for increasing a frictional force with the ground may be formed on the wheel outer peripheral portion 121b.

The driving wheel 121 may include a wheel frame (not illustrated) which fixes the wheel outer peripheral portion 121b and receives power from the motor 123. The shaft of the motor 123 is fixed to a center portion of the wheel frame, and thus, a rotational force can be transmitted to the wheel frame. The wheel outer peripheral portion 121b is disposed to surround a periphery of the wheel frame.

The driving wheel 121 includes a wheel cover 121a covering an outer surface of the wheel frame. The wheel cover 121a is disposed in a direction opposite to a direction in which the motor 123 is disposed based on the wheel frame. The wheel cover 121a is disposed at the center portion of the wheel outer peripheral portion 121b.

The traveler 120 includes the driving motor module 123 which generates a driving force. The traveler 120 includes the drive motor module 123 which provides the driving force to the driving wheel 121. The driving motor module 123 includes the first driving motor 123(L) which provides the driving force to the first wheel 121(L), and the second driving motor 123(R) which provides the driving force to the second wheel 121(R). The first driving motor 123(L) and the second driving motor 123(R) may be disposed spaced apart from side to side. The first driving motor 123(L) may be disposed on a left side of the second driving motor 123(R).

The first driving motor 123(L) and the second driving motor 123(R) may be disposed on the lower portion of the body 110. The first driving motor 123(L) and the second driving motor 123(R) may be disposed at the rear portion of the body 110.

The first driving motor 123(L) may be disposed on a right side of the first wheel 121(L), and the second driving motor 123(R) may be disposed on a left side of the second wheel 121(R). The first driving motor 123(L) and the second driving motor 123(R) are fixed to the body 110.

The first driving motor 123 (L) is disposed inside the first motor housing 119a, and the motor shaft may protrude to the left. The second driving motor 123(R) is disposed inside the second motor housing 119b, and the motor shaft may protrude to the right.

In the present embodiment, the first wheel 121(L) and the second wheel 121(R) are directly connected to a rotating shaft of the first driving motor 123(L) and a rotating shaft of the second driving motor 123(R), respectively. However, a component such as a shaft may be connected to the first wheel 121(L) and the second wheel 121(R), a rotational force of the motors 123(L) and 123(R) may be transmitted to the wheels 121a and 120b via a gear or chain.

The traveler 120 may include the auxiliary wheel 125 which supports the body 110 together with the driving wheel 121. The auxiliary wheel 125 may be disposed in front of the blade 131. The auxiliary wheel 125 is a wheel which does not receive the driving force by the motor, and serves to assist the body 110 with respect to the ground. A caster supporting a rotating shaft of the auxiliary wheel 125 is coupled to the frame 111 to be rotatable about a vertical axis. The first auxiliary wheel 125(L) disposed on the left side and the second auxiliary wheel 125(R) disposed on the right side may be provided.

The operator 130 is provided to perform a predetermined work. The operator 130 is disposed on the body 110.

For example, the operator 130 may be provided to perform works such as cleaning or lawn mowing. As another example, the operator 130 may be provided to perform a work such as transporting an object or finding an object. As still another example, the operator 130 may perform a security function for detecting an external intruder or a dangerous situation.

In the present embodiment, the operator 130 is described as performing mowing. However, a type of a work to be performed by the operator 130 may be various, and need not be limited to the example of the description.

The operator 130 may include the blade 131 rotatably provided to mow the lawn. The operator 130 may include a blade motor 132 which provides a rotational force to the blade 131.

The blade 131 is disposed between the driving wheel 121 and the auxiliary wheel 125. The blade 131 is disposed on the lower portion of the body 110. The blade 131 is provided to be exposed from the lower side of the body 110. The blade 131 rotates around a rotation axis extending in an up-down direction to mow the lawn.

The blade motor 132 may be disposed in front of the first wheel 121(L) and the second wheel 121(R). The blade motor 132 is disposed in a lower portion of a central portion in an inner space of the body 110.

The blade motor 132 may be disposed behind the auxiliary wheel 125. The blade motor 132 may be disposed in the lower portion of the body 110. The rotational force of the motor shaft is transmitted to the blade 131 using a structure such as a gear.

The moving robot 100 includes a battery (not illustrated) which supplies power to the driving motor module 123. The battery provides power to the first driving motor 123(L). The battery provides power to the second driving motor 123(R). The battery may supply power to the blade motor 132. The battery may provide power to a controller 190, an azimuth sensor 176, and an output unit 165. The battery may be disposed on a lower side of a rear portion in the inner space of the body 110.

The moving robot 100 is provided to change a height of the blade 131 with respect to the ground, and thus, can change a mowing height of the grass. The moving robot 100 includes the height adjuster 156 for the user to change the height of the blade 131. The height adjuster 156 may include a rotatable dial, and the dial is rotated to change the height of the blade 131.

The moving robot 100 includes the height display 157 which displays a level of the height of the blade 131. When the height of the blade 131 is changed according to an operation of the height adjuster 156, the height level displayed by the height display 157 is also changed. For example, the height display 157 may display a predicted height value of the lawn after the moving robot 100 performs lawn mowing with a current height of the blade 131.

The moving robot 100 includes a docking insertion 158 which is connected to a docking device 200 when the moving robot 100 docks with the docking device 200. The docking insertion 158 is provided to be recessed to be inserted into the docking connector 210 of the docking device 200. The docking insertion 158 is disposed on the front surface portion of the body 110. The moving robot 100 can be correctly guided when being charged by the connection of the docking insertion 158 and the docking connector 210.

The moving robot 100 may include a charging corresponding terminal 159 disposed at a position contactable with a charging terminal 211 to be described later in a state where the docking insertion 158 is inserted into the docking connector 210. The charging corresponding terminal 159 may include a pair of charging corresponding terminals 159a and 159b disposed at positions corresponding to the pair of charging terminals 211 (211a and 211b). The pair of charging correspondence terminals 159a and 159b may be disposed left and right in a state where the docking insertion portion 158 is interposed therebetween.

A terminal cover (not illustrated) may be provided to cover the docking insertion 158 and the pair of charging terminals 211 (211a, 211b) to be opened and closed. When the moving robot 100 travels, the terminal cover may cover the docking insertion 158 and the pair of charging terminals 211 (211a and 211b). When the moving robot 100 is connected to the docking device 200, the terminal cover is opened, and the docking insertion 158 and the pair of charging terminals 211 (211a and 211b) may be exposed.

Figure 5:
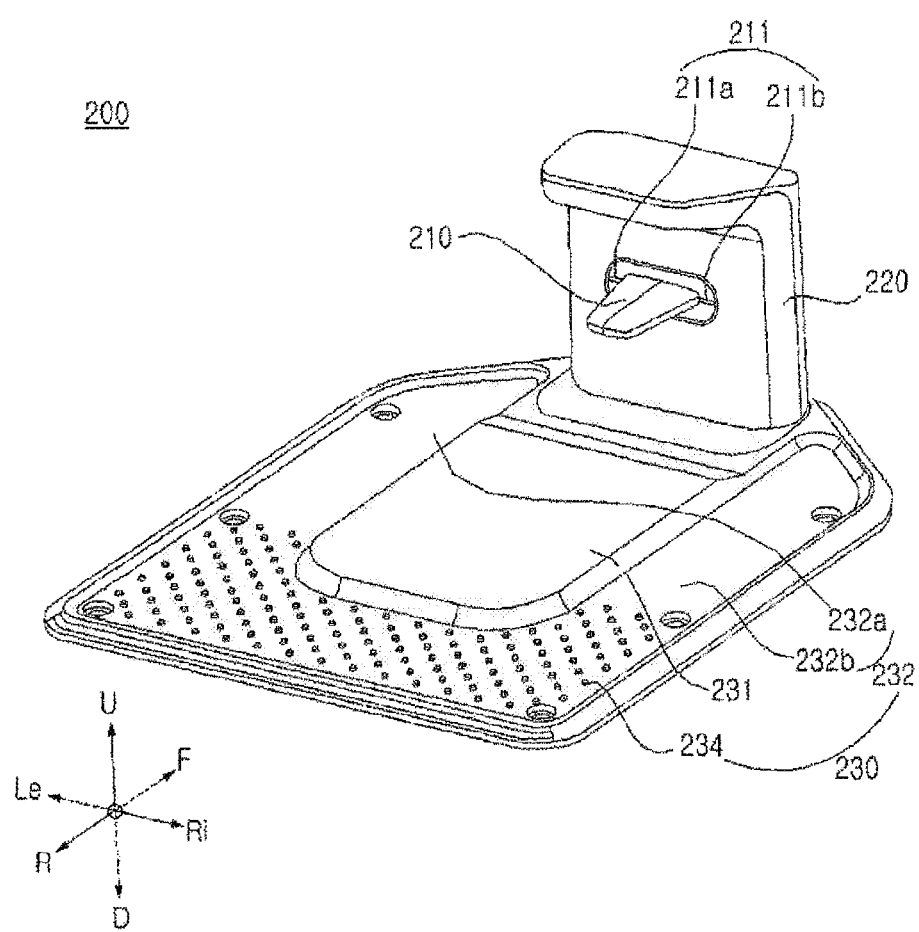
FIG. 5 is a perspective view illustrating a docking device 200 which docks the moving robot 100 of FIG. 1.
Figure 6:
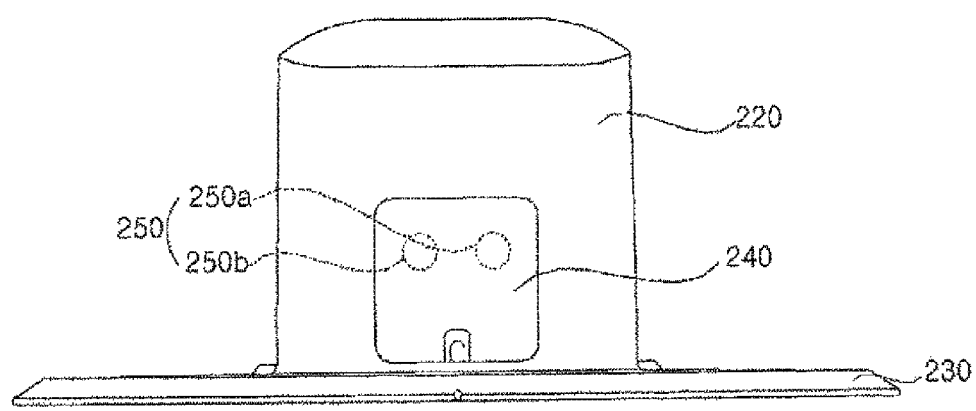
FIG. 6 is an elevational view when the docking device 200 of FIG. 5 is viewed from the front.
Figure 6:
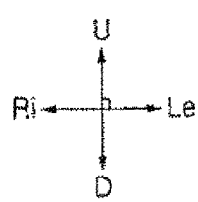

Meanwhile, referring to FIGS. 5 and 6, the docking device 200 includes a docking base 230 disposed on the floor and a docking support 220 protruding upwardly from a front portion of the docking base 230.

The docking base 230 defines a surface parallel in a horizontal direction. The docking base 230 has a plate shape so that the moving robot 100 can be seated. The docking support 220 extends from the docking base 230 in a direction intersecting the horizontal direction.

The moving robot 100 includes the docking connector 210 which is inserted into the docking insertion 158 when the moving robot 100 is charged. The docking connector 210 protrude rearward from the docking support 220.

The docking connector 210 may have a thickness in the up-down direction smaller than a width in the right-left direction. The width of the docking connector 210 in the right-left direction may narrowed rearward. When viewed from above, a shape of the docking connection 210 is trapezoidal in whole. The docking connector 210 is formed in a right and left symmetrical shape. A rear portion of the docking connector 210 forms a free end, and a front portion of the docking connector 210 is fixed to the docking support 220. The rear portion of the docking connector 210 may be formed in a rounded shape.

When the docking connector 210 is completely inserted into the docking insertion 158, the moving robot 100 may be charged by the docking device 200.

The docking device 200 includes the charging terminal 211 for charging the moving robot 100. The charging terminal 211 and the charging corresponding terminal 159 of the moving robot 100 come into contact with each other, and thus, power for charging may be supplied from the docking device 200 to the moving robot 100.

The charging terminal 211 includes a contact surface facing the rear side, and the charging corresponding terminal 159 includes a contact corresponding surface facing the front side. The contact surface of the charging terminal 211 and the contact corresponding surface of the charging corresponding terminal 159 come into contact with each other, and thus, the power of the docking device 200 is connected to the moving robot 100.

The charging terminal 211 may include the pair of charging terminals 211 (211a and 211b) forming positive and negative poles. The first charging terminal 211(211a) is provided to come into contact with the first charging terminal 159a, and the second charging terminal 211(211b) is provided to come into contact with the second charging terminal 159b.

The pair of charging terminals 211 (211a and 211b) may be disposed in a state where the docking connector 210 is interposed therebetween. The pair of charging terminals 211 (211a and 211b) may be disposed on right and left of the docking connector 210.

The docking base 230 includes a wheel guard 232 on which the driving wheel 121 and the auxiliary wheel 125 of the moving robot 100 ride. The wheel guard 232 includes a first wheel guard 232a which guides a movement of the first auxiliary wheel 125 and a second wheel guard 232b which guides a movement of the second auxiliary wheel 125. An upper convex center base 231 is disposed between the first wheel guard 232a and the second wheel guard 232b. The docking base 230 includes a slip prevention 234 for preventing slipping of the first wheel 121(L) and the second wheel 121(R). The slip prevention 234 may include a plurality of protrusions protruding upward.

Meanwhile, a boundary wire 290 for setting a boundary of a traveling area of the moving robot 100 may be implemented. The boundary wire 290 may generate a predetermined boundary signal. The moving robot 100 may detect a boundary signal and recognize a boundary of the traveling area set by the boundary wire 290.

For example, a predetermined current flows along the boundary wire 290 to generate a magnetic field around the boundary wire 290. Here, the generated magnetic field is a boundary signal. An AC current having a predetermined change pattern may flow through the boundary wire 290 so that the magnetic field generated around the boundary wire 290 may be changed to have a predetermined change pattern. The moving robot 100 can recognize that the moving robot 100 approaches the boundary wire 290 within a predetermined distance using a boundary signal detector 177 which detects the magnetic field, and thus, the moving robot 100 can travel only the traveling area within the boundary set by the boundary wire 290.

The boundary wire 290 may generate a magnetic field in a direction different from a reference wire 270. For example, the boundary wire 290 may be disposed substantially parallel to the horizontal plane. Here, the "substantially parallel" can include parallelism in an engineering sense, including complete parallelism in a mathematical sense and a certain level of error.

The docking device 200 may serve to transmit a predetermined current to the boundary wire 290. The docking device 200 may include a wire terminal 250 connected to the boundary wire 290. Both ends of the boundary wire 290 may be connected to a first wire terminal 250a and a second wire terminal 250b, respectively. When the boundary wire 290 and the wire terminal 250 are connected to each other, the power of the docking device 200 can supply a current to the boundary wire 290.

The boundary wire 290 may include a plurality of boundary wires defining boundaries of a plurality of traveling areas. That is, the entire area can be divided into two areas for a random homing traveling path.

The wire terminal 250 may be disposed at a front portion F of the docking device 200. That is, the wire terminal 250 may be disposed on a side opposite to a direction in which the docking connector 210 protrudes. The wire terminal 250 may be disposed on the docking support 220. The first wire terminal 250a and the second wire terminal 250b may be disposed spaced apart from side to side.

The docking device 200 may include a wire terminal opening/closing portion 240 which covers the wire terminal 250 so that the wire terminal 250 can be opened or closed. The wire terminal opening/closing portion 240 may be disposed at the front portion F of the docking support 220. The wire terminal opening/closing portion 240 is hinged to the docking support 220 and may be preset to perform an opening/closing operation when the wire terminal opening/closing portion 240 is rotated.

Meanwhile, the reference wire 270 for recognizing the position of the docking device 200 to the moving robot 100 may be implemented. The reference wire 270 may generate a predetermined docking position signal. The moving robot 100 detects the docking position signal, recognizes the position of the docking device 200 by the reference wire 270, and may return to the recognized position of the docking device 200 when a return command or charging is required. The position of the docking device 200 may be a reference point of the traveling of the moving robot 100.

The reference wire 270 is formed of a conductive material through which electricity can flow. The reference wire 270 may be connected to the power supply of the docking device 200 to be described later.

For example, a magnetic field may be generated around the reference wire 270 by causing a predetermined current to flow along the reference wire 270. Here, the generated magnetic field is the docking position signal. By allowing an alternating current having a predetermined change pattern to flow through the reference wire 270, a magnetic field generated around the reference wire 270 may change with a predetermined change pattern. The moving robot 100 can recognize that the moving robot 100 is close to the reference wire 270 within a predetermined distance by using the boundary signal detector 177 which detects the magnetic field, and accordingly, the moving robot 100 can return to the position of the docking device 200 set by the reference wire 270.

The reference wire 270 may generate the magnetic field in a direction distinct from the boundary wire 290. For example, the reference wire 270 may extend in a direction intersecting the horizontal direction. Preferably, the reference wire 270 may extend in the up-down direction orthogonal to the horizontal direction.

The reference wire 270 may be installed on the docking device 200. The reference wire 270 may be disposed at various positions in the docking device 200.

Figure 7A:
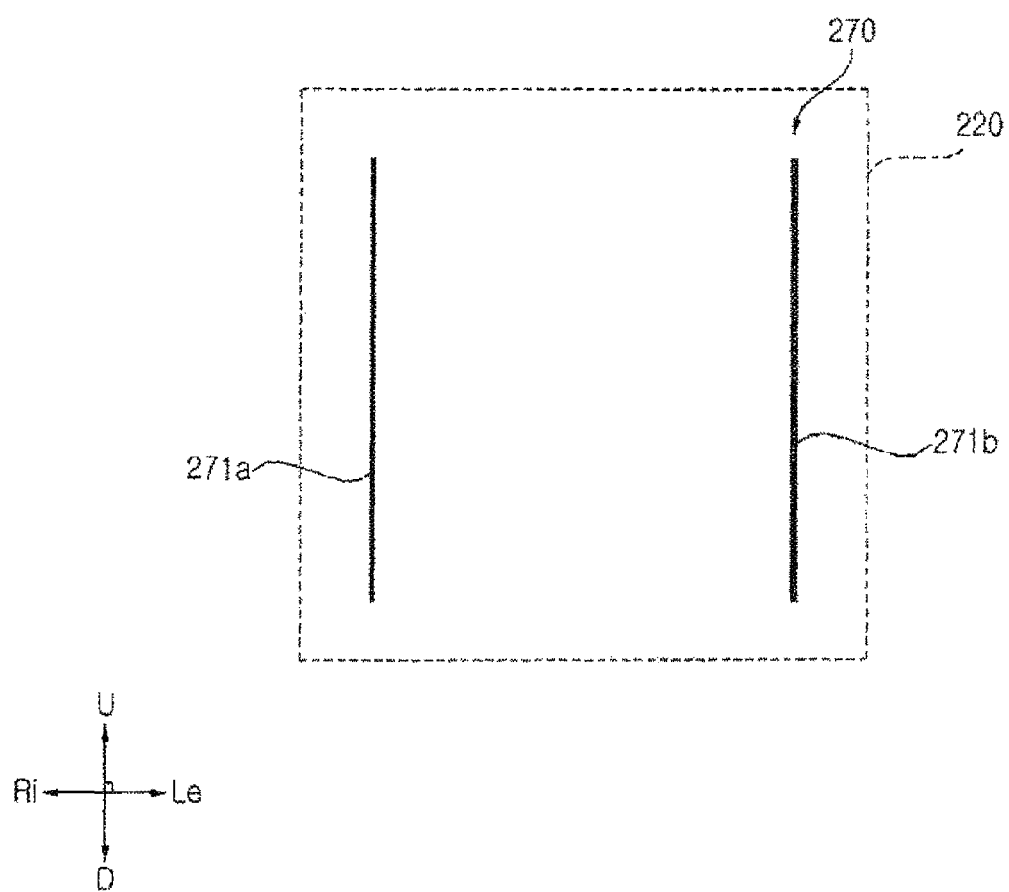
FIG. 7A is a view when a reference wire according to an embodiment of the present disclosure is viewed from the rear.
Figure 7B:
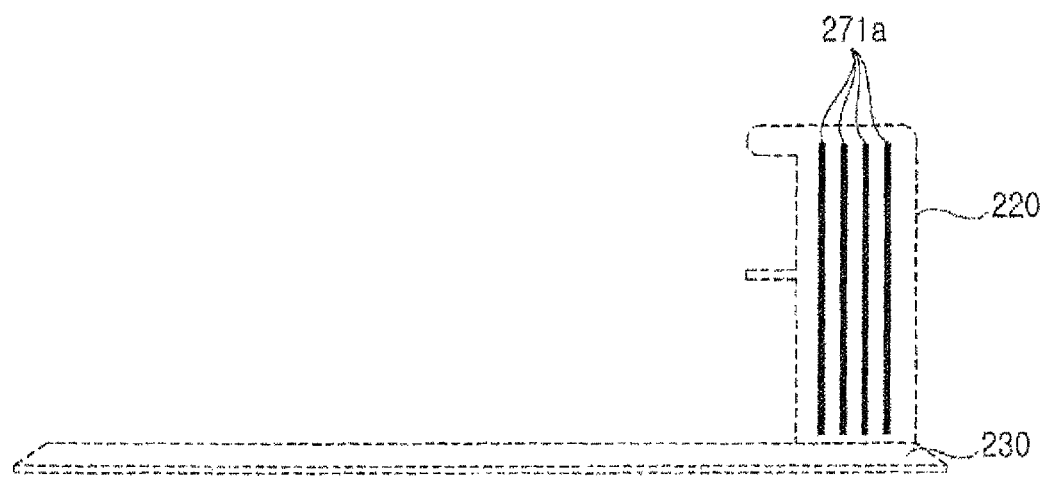
FIG. 7B is a view when the reference wire according to the embodiment of the present disclosure is viewed from one side.

FIG. 7A is a view when the reference wire 270 according to a first embodiment of the present disclosure is viewed from the rear, and FIG. 7B is a view when the reference wire 270 according to the first embodiment of the present disclosure is viewed from one side.

With reference to FIGS. 6, 7A, and 7B, the reference wire 270 according to the first embodiment may be disposed inside the docking support 220. Since the reference wire 270 needs to generate a magnetic field signal in the horizontal direction, the reference wire 270 is disposed to extend in the vertical direction. When the reference wire 270 is disposed on the docking base 230, there is a disadvantage that a thickness of the docking base 230 becomes very thick.

The reference wire 270 may include at least a vertical portion 271 extending in a direction intersecting the horizontal direction. The vertical portion 271 may be disposed substantially in parallel with the up-down direction UD.

A direction of electricity input into the vertical portion 271 of the reference wire 270 may proceed from the top to the bottom or from the bottom to the top.

A plurality of vertical portions 271 may be disposed in order to generate the docking position signal more than a certain level in the entire peripheral area of the docking device 200. For example, the vertical portion 271 may include a first vertical portion 271a and a second vertical portion 271b which is disposed to be spaced apart from the first vertical portion 271a. Of course, the vertical portion 271 may include only one of the first vertical portion 271a and the second vertical portion 271b.

The first vertical portion 271a and the second vertical portion 271b are disposed to be spaced apart in the right-left direction. The first vertical portion 271a may be disposed adjacent to a right end of the docking support 220, and the second vertical portion 271b may be disposed adjacent to a left end of the docking support 220. When the first vertical portion 271a and the second vertical portion 271b are disposed adjacent to both ends of the docking support 220, an area in which the magnetic field is generated by the reference wire 270 is expanded as far as possible around the docking device 200.

The first vertical portion 271a and the second vertical portion 271b may have the same or different directions of current. Preferably, when electricity flows from the top to the bottom in the first vertical portion 271a, electricity may flow in the second vertical portion 271b from the bottom to the top.

In order to reinforce the strength of the electric field of the first vertical portion 271a and the second vertical portion 271b, a plurality of first vertical portions 271a and a plurality of second vertical portions 271b may be provided, respectively. Each of the first vertical portion 271a and the second vertical portion 271b may be an assembly of several wires, and the first vertical portion 271a and the second vertical portion 271b may have a certain arrangement. Of course, one first vertical portion 271a and one second vertical portion 271b may be disposed.

For example, a plurality of first vertical portions 271a may be disposed in a row along a line extending in the front-rear direction, and a plurality of second vertical portions 271b may be disposed in a row along a line extending in the front-rear direction.

When the plurality of first vertical portions 271a and the second vertical portions 271b are disposed at both ends of the docking support 220 in the right-left direction and disposed in rows in the front-rear direction, the charging terminal 211 and the docking connector 210 may be disposed between the plurality of first vertical portions 271a and the second vertical portion 271b. When the charging terminal 211 and the docking connector 210 are disposed between the plurality of first vertical portions 271a and the plurality of second vertical portions 271b, there is an advantage in that the reference wire 270 can be disposed without changing configurations of the charging terminal 211 and the docking connector 210.

The plurality of first vertical portions 271a and the plurality of second vertical portions 271b may be electrically connected to each other or may receive electricity from a separate power source. The docking device 200 may serve to send a predetermined current to the reference wire 270. The docking device 200 may include the wire terminal 250 connected to the reference wire 270. Both ends of the reference wire 270 may be connected to the first wire terminal 250a and the second wire terminal 250b, respectively. Through the connection between the reference wire 270 and the wire terminal 250, the power of the docking device 200 may supply current to the reference wire 270.

Specifically, both ends of the plurality of first vertical portions 271a may be connected to the first wire terminal 250a and the second wire terminal 250b, respectively, and both ends of the plurality of second vertical portions 271b may be connected to the first wire terminal 250a and the second wire terminal 250b, respectively.

Of course, the reference wire 270 according to another example may further include a horizontal portion (not illustrated). In this case, the reference wire 270 may have a structure in which the first vertical portion 271a and the second vertical portion 271b are connected to each other to receive power from one power source.

Figure 8:
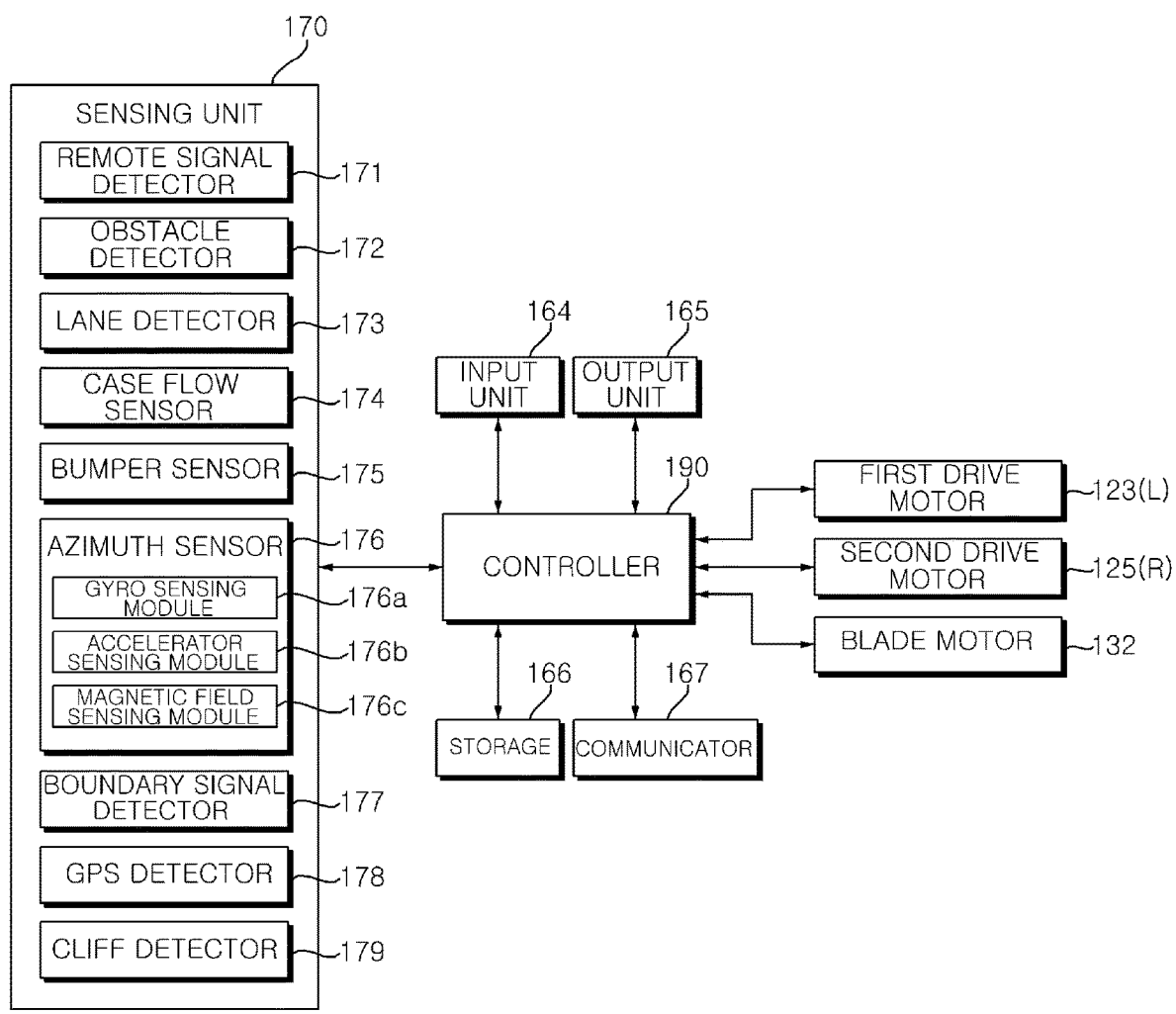
FIG. 8 is a block diagram illustrating a control relationship of the moving robot 100 of FIG. 1.

FIG. 8 is a block diagram illustrating a control relationship of the moving robot 100 of FIG. 1.

Meanwhile, referring to FIG. 8, the moving robot 100 may include the input unit 164 capable of inputting various instructions of the user. The input unit 164 may include a button, a dial, and a touch-type display. The input unit 164 may include a microphone (not illustrated) for speech recognition. In the present embodiment, a plurality of buttons are disposed on an upper portion of the case 112.

The moving robot 100 may include the output unit 165 which outputs various information to the user. The output unit 165 may include a display module which outputs visual information. The output unit 165 may include a speaker (not illustrated) which outputs auditory information.

In the present embodiment, the display module 165 outputs an image upward. The display module 165 is disposed on the upper portion of the case 112. As an example, the display module 165 may include a thin film transistor liquid-crystal display (LCD) panel. In addition, the display module 165 may be implemented using various display panels such as a plasma display panel or an organic light emitting diode display panel.

The moving robot 100 includes a storage 166 for storing various information. The storage 166 records various information necessary for the control of the moving robot 100, and may include a volatile or nonvolatile recording medium. The storage 166 may store information input from the input unit 164 or received by a communicator 167. A program for controlling the moving robot 100 may be stored in the storage 166.

The moving robot 100 may include the communicator 167 for communicating with an external device (terminal or the like), a server, a router, or the like. For example, the communicator 167 may be implemented to wirelessly communicate with wireless communication technologies such as IEEE 802.11 WLAN, IEEE 802.15 WPAN, UWB, Wi-Fi, Zigbee, Z-wave, and Blue-Tooth. The communicator may be changed depending on the communication method of another device or a server.

The moving robot 100 includes a sensing unit 170 which senses information related to a state of the moving robot 100 or an environment outside the moving robot 100. The sensing unit 170 may be include at least one of a remote signal detector 171, an obstacle detector 172, a rain detector 173, a case movement sensor 174, a bumper sensor 175, azimuth sensor 176, boundary signal detector 177, a GPS detector 178, and a cliff detector 179.

The remote signal detector 171 receives an external remote signal. When the remote signal is transmitted by an external remote controller, the remote signal detection unit 171 may receive the remote signal. For example, the remote signal may be an infrared signal. The signal received by the remote signal detector 171 may be processed by the controller 190.

A plurality of remote signal detector 171 may be provided. The plurality of remote signal detectors 171 include a first remote signal detection unit 171*a* disposed on the front portion of the body 110 and a second remote signal detection unit 171*b* disposed on the rear portion of the body 110. The first remote signal detector 171*a* receives a remote signal transmitted from the front. The second remote signal detector 171*b* receives a remote signal transmitted from the rear.

The obstacle detector 172 detects an obstacle around the moving robot 100. The obstacle detector 172 may detect an obstacle in front. A plurality of obstacle detectors 172*a*, 172*b*, and 172*c* may be provided. The obstacle detector 172 is disposed on the front surface of the body 110. The obstacle detector 172 is disposed above the frame 111. The obstacle detector 172 may include an infrared sensor, an ultrasonic sensor, an RF sensor, a geomagnetic sensor, a Position Sensitive Device (PSD) sensor, or the like.

The rain detector 173 detects rain when rain occurs in an environment where the moving robot 100 is placed. The rain detector 173 may be disposed in the case 112.

The case movement sensor 174 detects the movement of the case connector. When the case 112 is raised upward with respect to the frame 111, the case connector moves upward, and the case movement sensor 174 detects that the case 112 is raised. When the case movement sensor 174 detects that the case 112 is raised, the controller 190 may control to stop the operation of the blade 131. For example, when the user raises the case 112 or a situation in which the case 112 is raised by a lower obstacle having a significant size occurs, the case movement sensor 174 may detect this.

The bumper sensor 175 can detect a rotation of the movable fixing portion. For example, a magnet may be disposed on one side of the lower portion of the movable fixing portion, and a sensor which detects a change in the magnetic field of the magnet may be disposed on the frame 111. When the movable fixing portion rotates, the sensor detects the change in the magnetic field of the magnet, and thus, the bumper sensor 175 which detects the rotation of the movable fixing portion can be implemented. When the bumper 112*b* collides with an external obstacle, the movable fixing portion rotates integrally with the bumper 112*b*. The bumper sensor 175 may detect the rotation of the movable fixing portion, and thus, detect an impact of the bumper 112*b*.

The azimuth sensor (AHRS) 176 may have a gyro sensing function. The azimuth sensor 176 may further include an acceleration sensing function. The azimuth sensor 176 may further include a magnetic field sensing function.

The azimuth sensor 176 may include a gyro sensing module 176*a* which performs gyro sensing. The gyro sensing module 176*a* may detect the horizontal rotational speed of the body 110. The gyro sensing module 176*a* may detect a tilting speed with respect to the horizontal surface of the body 110.

The gyro sensing module 176*a* may include a gyro sensing function for three axes of a spatial coordinate system orthogonal to each other. The information collected by the gyro sensing module 176*a* may be roll, pitch, and yaw information. The processing module can calculate a direction angle of the moving robot 100 by integrating the angular velocities of rolling, pitching, and yaw.

The azimuth sensor 176 may include an acceleration sensing module 176*b* which performs acceleration sensing. The acceleration sensing module 176*b* may have an acceleration sensing function for the three axes of the spatial coordinate system orthogonal to each other. A given processing module can calculate the speed by integrating the acceleration, and can calculate a moving distance by integrating the speed.

The azimuth sensor 176 may include a magnetic field sensing module 176*c* which performs magnetic field sensing. The magnetic field sensing module 176*c* may have a magnetic field sensing function for three axes of a spatial coordinate system orthogonal to each other. The magnetic field sensing module 176*c* may detect the magnetic field of the Earth.

The boundary signal detector 177 detects the boundary signal of the boundary wire 290 or/and the docking position signal of the reference wire 270.

The boundary signal detector 177 may be disposed in the front portion of the body 110. Accordingly, it is possible to detect the boundary of the traveling area early while moving forward, which is a main traveling direction of the moving robot 100. The boundary signal detector 177 may be disposed in an inner space of the bumper 112*b*.

The boundary signal detector 177 may include a first boundary signal detector 177*a* and a second boundary signal detector 177*b* which are spaced apart from side to side. The first boundary signal detector 177*a* and the second boundary signal detector 177*b* may be disposed in the front portion of the body 110.

For example, the boundary signal detector 177 includes a magnetic field sensor. The boundary signal detector 177 may be implemented using a coil to detect a change in a magnetic field. The boundary signal detector 177 may detect a magnetic field in at least a horizontal direction. The boundary signal detector 177 may detect a magnetic field with respect to three axes which are orthogonal to each other in space.

Specifically, the first boundary signal detector 177*a* may detect a magnetic field signal in a direction orthogonal to the second boundary signal detector 177*b*. The first boundary signal detector 177*a* and the second boundary signal detector 177*b* may detect magnetic field signals in directions orthogonal to each other, and combine the detected magnetic field signal values to detect the magnetic field with respect to the three axes orthogonal to each other in the space.

When the boundary signal detector 177 detects the magnetic field with respect to the three axes which are orthogonal to each other in space, the direction of the magnetic field is determined by a sum vector value of the three axes, and if the direction of the magnetic field is close to the horizontal direction, the docking position signal can be recognized, and if the direction of the magnetic field is close to the vertical direction, the boundary signal can be recognized.

In addition, when a plurality of divided traveling areas are present, the boundary signal detector 177 may distinguish between an adjacent boundary signal and boundary signals of the plurality of traveling areas by a difference in intensities of magnetic fields, and distinguish between the adjacent boundary signal and the docking position signal by a difference in directions of the magnetic fields.

As another example, when the plurality of divided traveling areas are present, the boundary signal detector 177 may distinguish between the adjacent boundary signal and the boundary signals of the plurality of traveling areas by a difference in a magnetic field distribution. Specifically, the boundary signal detector 177 may detect that the intensity of the magnetic field has a plurality of peaks within a preset distance on plane coordinates and recognize the signal as the adjacent boundary signal.

The GPS detector 178 may be provided to detect a Global Positioning System (GPS) signal. The GPS detector 178 may be implemented using a PCB.

The cliff detection unit 179 detects the presence of a cliff on the traveling surface. The cliff detection unit 179 is disposed in the front portion of the body 110 and can detect the presence or absence of a cliff in front of the moving robot 100.

The sensing unit 170 may include an opening/closing detector (not illustrated) which detects whether at least one of the first opening/closing unit 117 and the second opening/closing unit 118 is opened or closed. The opening/closing detector may be disposed in the case 112.

The moving robot 100 includes the controller 190 which controls autonomous traveling. The controller 190 may process a signal of the sensing unit 170. The controller 190 can process a signal of the input unit 164.

The controller 190 may control the driving of the first driving motor 123(L) and the second driving motor 123(R). The controller 190 may control the driving of the blade motor 132. The controller 190 can control the output of the output unit 165.

The controller 190 includes a main board (not illustrated) disposed in the inner space of the body 110. The main board means a PCB.

The controller 190 may control the autonomous driving of the moving robot 100. The controller 190 may control the driving of the traveler 120 based on the signal received from the input unit 164. The controller 190 may control the driving of the traveler 120 based on the signal received from the sensing unit 170.

In addition, the controller 190 may process the signal of the boundary signal detector 177. Specifically, the controller 190 may determine a current position by analyzing the boundary signal through the boundary signal detector 177 and control the driving of the traveler 120 according to a traveling pattern.

In this case, the controller 190 may control the traveler 120 according to the traveling pattern in a zigzag mode.

Hereinafter, the traveling in the zigzag mode under control of the controller 190 will be described with reference to FIG. 9.

Figure 9:
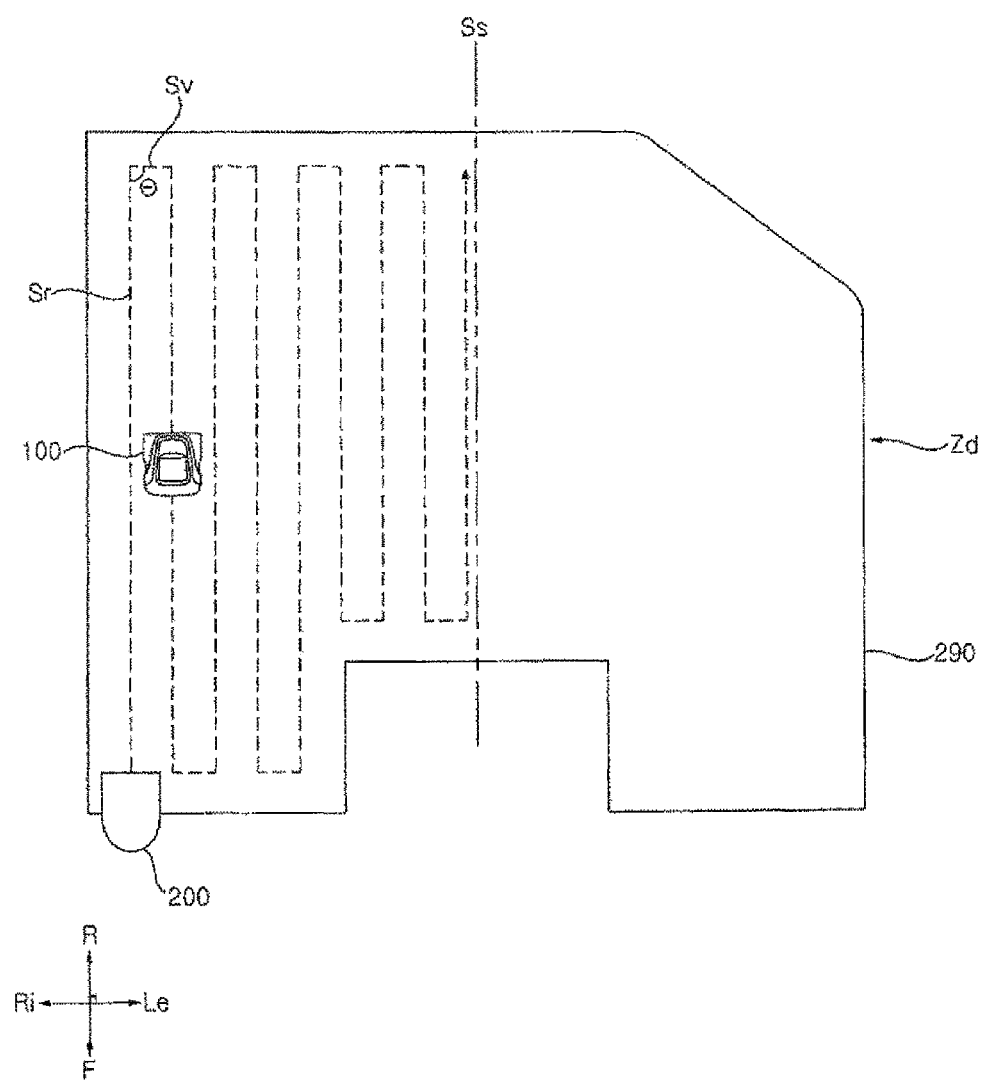
FIG. 9 is a diagram illustrating a moving robot system according to an embodiment of the present disclosure.

FIG. 9 is a diagram illustrating a moving robot 100 system according to an embodiment of the present disclosure.

Referring to FIG. 9, the moving robot 100 system of the present disclosure may include a boundary wire 290 defining one traveling area Zd, and the moving robot 100 traveling inside the traveling area Zd. In addition, the moving robot 100 system of the present disclosure may further include a docking device 200 to which the moving robot 100 is docked and charged.

In this case, in FIG. 9, one traveling area Zd is illustrated as an example, but the present disclosure is not limited thereto, and a plurality of traveling areas Zd may be formed.

The controller 190 may perform a pattern traveling mode in which the moving robot travels one traveling area Zd in a predetermined pattern. A predetermined pattern traveling mode for moving the body 110 along predetermined pattern path Sr and Sv is preset. The pattern traveling mode includes at least a predetermined algorithm for driving the traveler 120. The pattern traveling mode may include an algorithm for driving the traveler 120 according to the detection signal from the sensing unit 170.

Specifically, in FIG. 9, the moving robot 100 may travel in a zigzag mode with a position, at which the docking device 200 is disposed within the traveling area Zd, as a starting point. That is, the moving robot 100 travels along a major axis Sr backward R from the starting point. In this case, when the boundary signal from the boundary wire 290 is received and an edge area is determined, the moving robot 100 rotates in a direction in which a residual area exits, that is, rotates right in FIG. 9, and travels along the minor axis Sv.

In this case, a rotation angle θ may be an angle of 120° to 60°, and preferably, may satisfy approximately 90°. In addition, it is possible to rotate to have a predetermined curvature when rotating to the right.

Next, when the traveling along the minor axis Sv ends, the moving robot rotates right according to the signal from the boundary wire 290 again and travels along the major axis Sr.

In this case, the traveling along the major axis Sr is to move forward F, and in this way, the moving robot travels in the zigzag mode within one traveling area Zd alternately between the major axis Sr and the minor axis Sv and mows the lawn. Therefore, a plurality of major axes Sr and a plurality of minor axes Sv for traveling within one traveling area (Zd) may be designed as a target pattern, and the plurality of major axes Sr may be parallel to each other.

In this case, when the moving robot reaches the edge area while mowing the lawn in the traveling area Zd in the zigzag mode, in a case where it is determined that there is no more area to travel right along the traveling direction according to the boundary signal from the boundary wire 290, the moving robot performs traveling toward the docking device 200 according to a homing mode, and thus, first traveling is completed.

In this way, the lengths of the major axis Sr and minor axis Sv are set when one traveling area Zd is formed, the moving robot travels in a zigzag mode along the set major axis Sr and minor axis Sv, the lawn mower robot which is the moving robot 100 moves according to the pattern traveling mode while rotating the blade 131, and thereby, can uniformly mow the lawn in the traveling area Zd.

By completing the traveling in the traveling area Zd in the pattern traveling mode a plurality of times, it is possible to mow the lawn with a length of about 1 to 2 mm for each traveling. Accordingly, since the lawn is mowed a plurality of times, it is possible to reduce discomfort of the use caused by a visible difference between the traveling area Zd and the non-traveling area Zd.

In this case, the controller 190 may control the traveling direction of the traveler 120 to change an angle of the pattern traveling mode for each traveling.

Hereinafter, with respect to traveling in the traveling area (Zd) a plurality of times, it is defined as a first pattern traveling mode, a second pattern traveling mode, . . . , a nth pattern traveling mode.

In addition, by setting an arbitrary reference line Ss in the traveling area Zd, a direction of the reference line (Ss) can be controlled.

In the first pattern traveling mode, the controller 190 starts traveling by setting the major axis Sr of the traveling pattern to a first angle θ1 in the clockwise direction with respect to the reference line Ss. For example, as illustrated in FIG. 9, in the first pattern traveling mode, the major axis Sr of the traveling pattern may be set to 0° with respect to the reference line Ss to travel parallel to the reference line Ss.

When the traveling angle of the major axis Sr is set as described above, the traveler 120 performs the traveling at the set angle according to the control of the controller 190.

When traveling up to an end point nt of the traveling area Zd in the first pattern traveling mode to is completed, the controller 190 may continuously performs the second pattern traveling mode. In this case, the controller 190 may change the angle of the major axis Sr in the first pattern traveling mode to set the second pattern traveling mode to the changed traveling angle. The traveler 120 performs traveling in the second pattern traveling mode at a newly set traveling angle.

In this way, the controller 190 may minimize the un-traveling area Zd by changing the angle of the major axis Sr of the traveling pattern differently with respect to the reference line Ss in the pattern traveling mode of each round.

The control of the traveling direction of the controller 190 will be described in detail.

Figure 10:
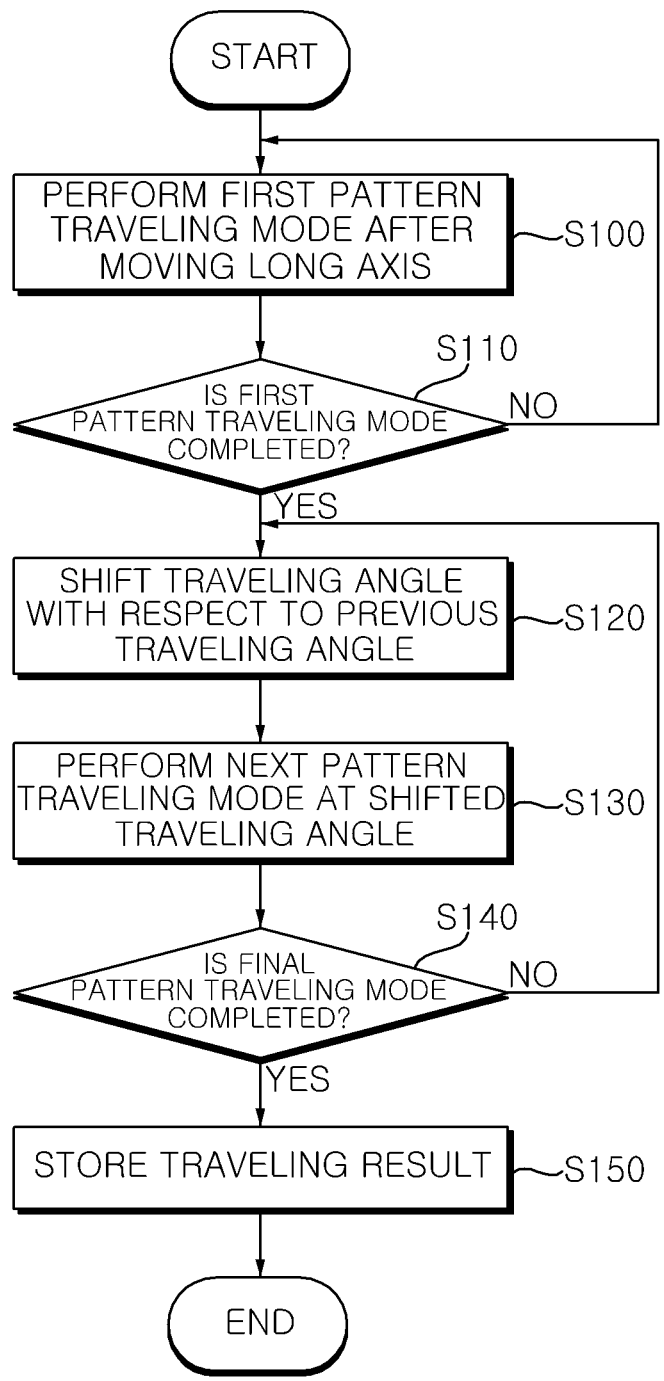
FIG. 10 is a flowchart illustrating a method of controlling one traveling angle of a moving robot.
Figure 11A:
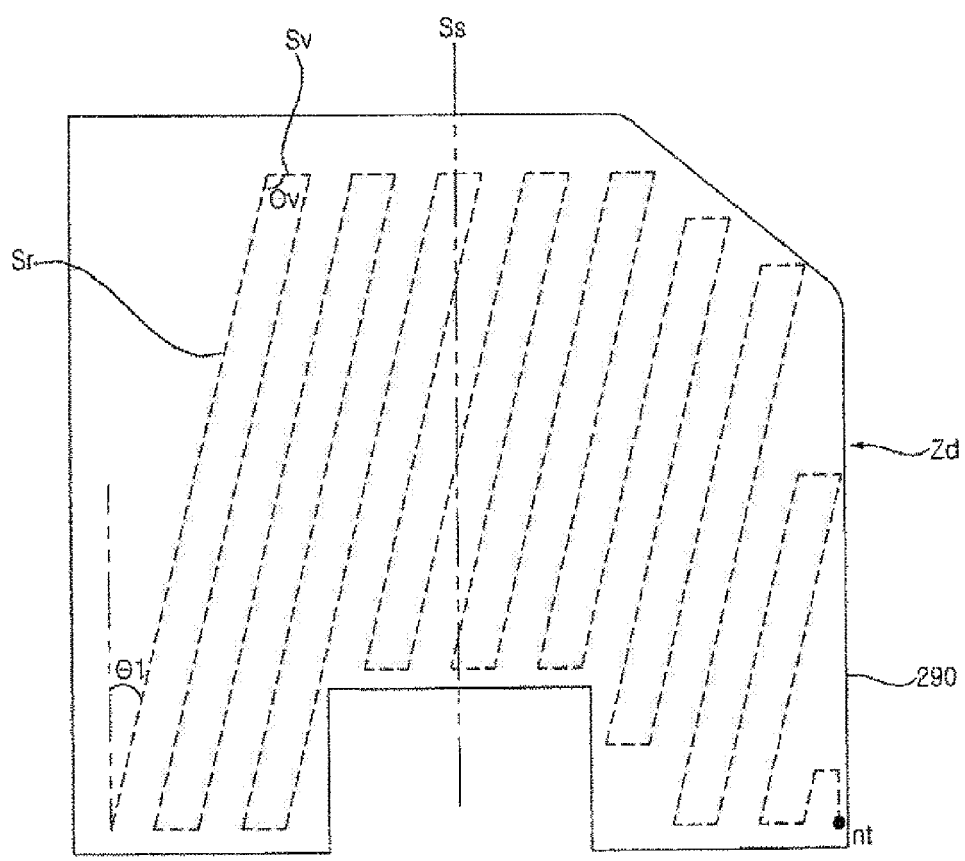
FIGS. 11A and 11B are state diagrams illustrating an angle change according to the first embodiment.
Figure 11B:
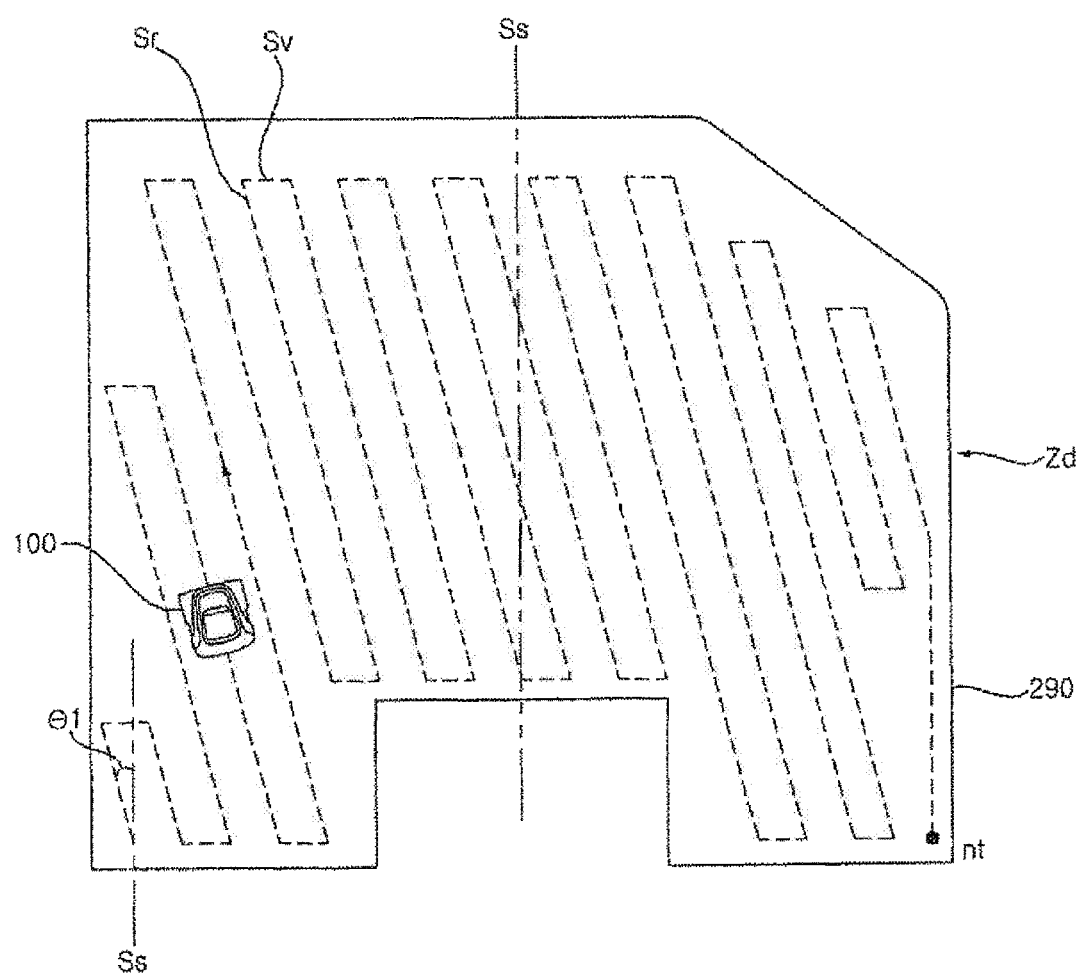
Figure 12A:
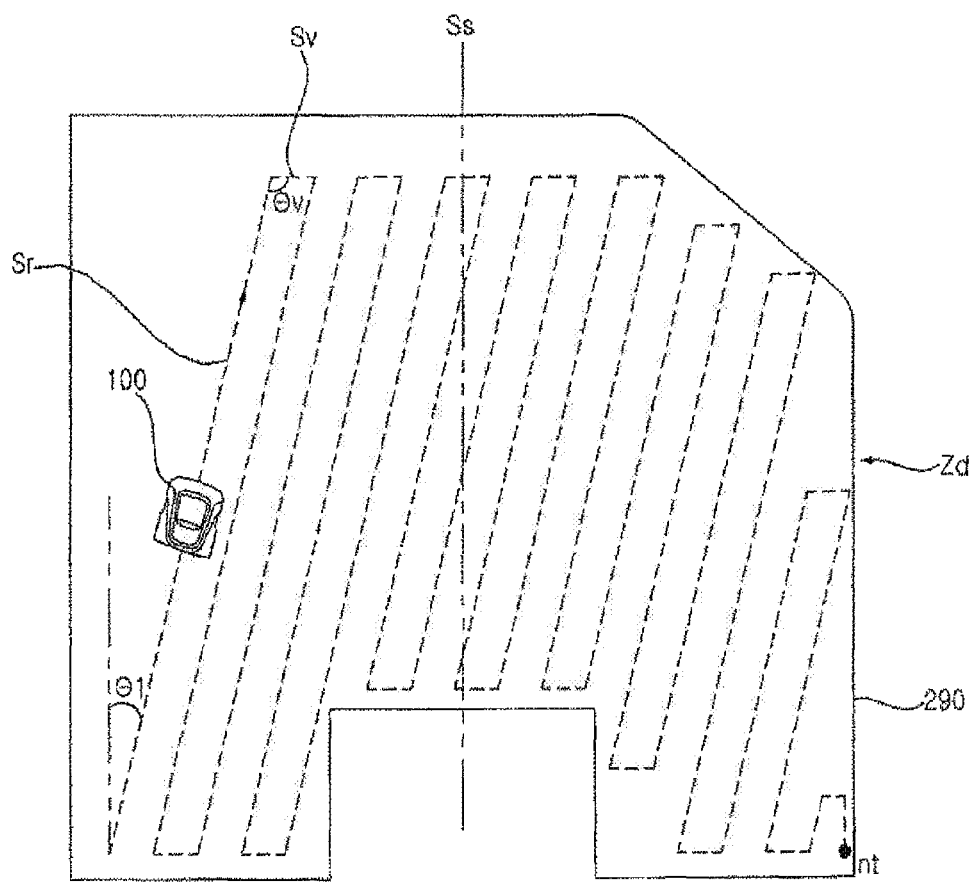
FIGS. 12A to 12C are state diagrams illustrating an angle change according to a second embodiment.
Figure 12B:
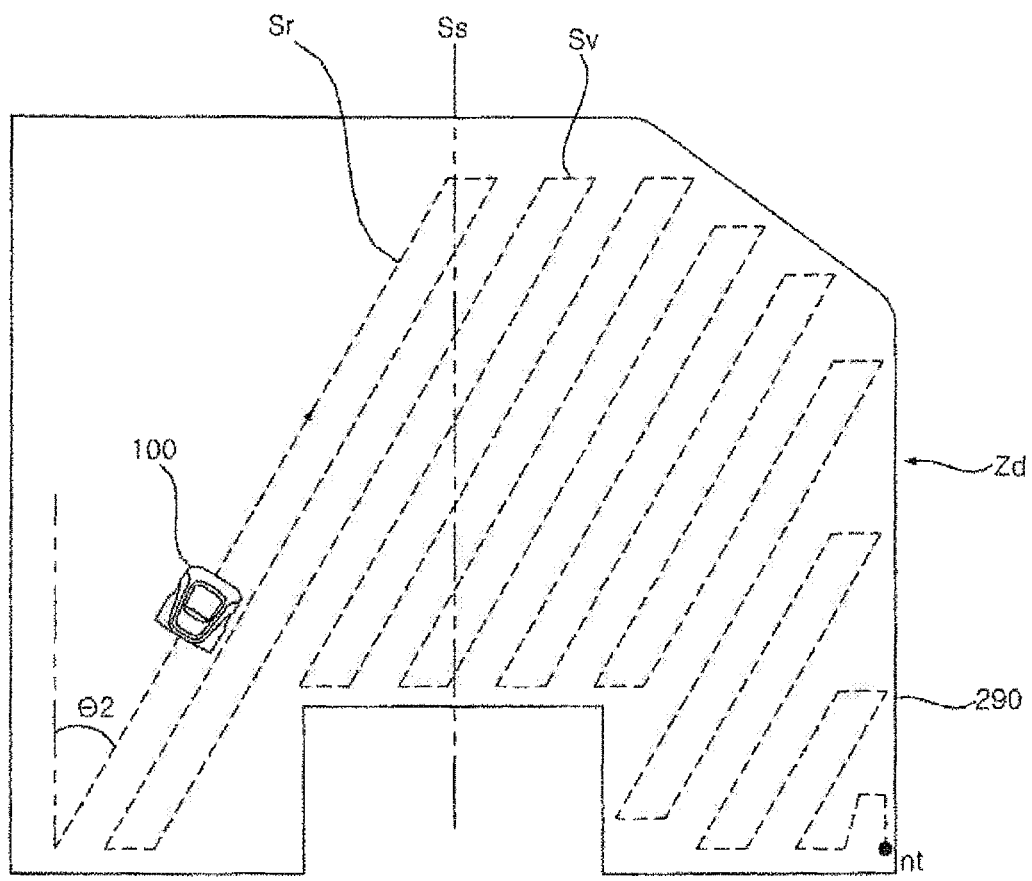
Figure 12C:
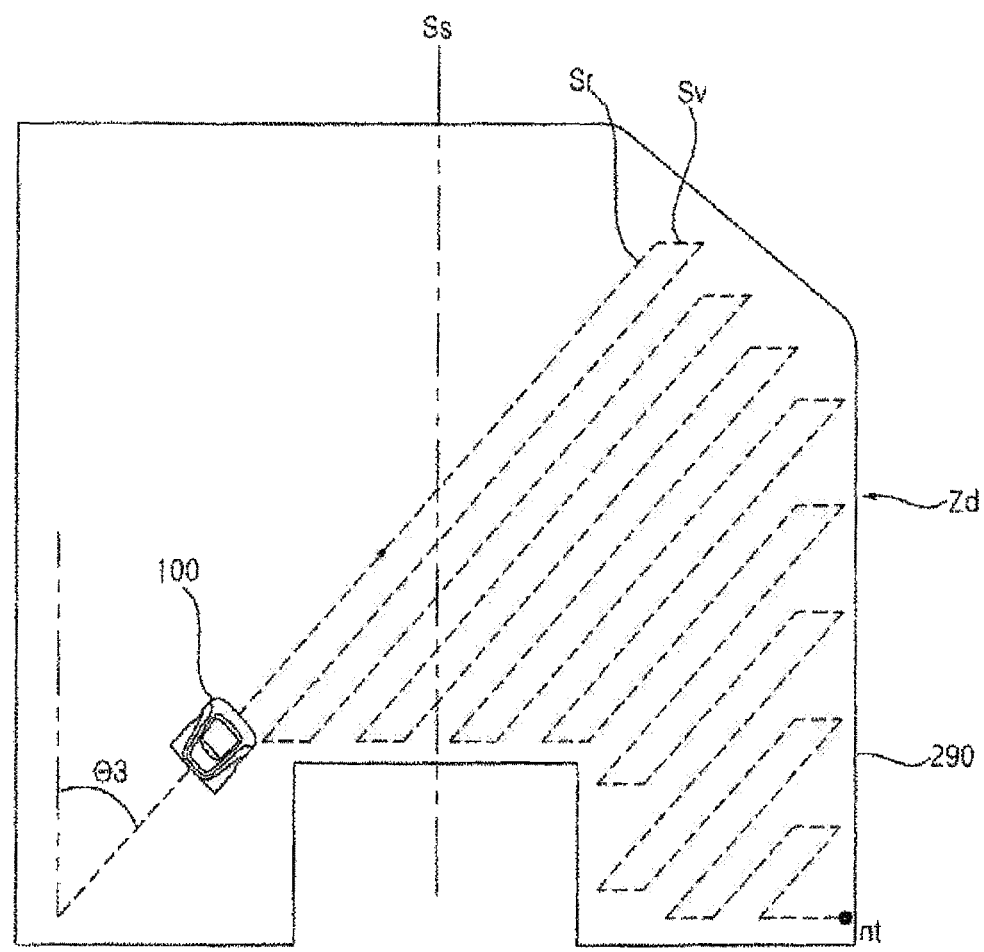

FIG. 10 is a flowchart illustrating a method of controlling one traveling angle of the moving robot 100, FIGS. 11A and 11B are state diagrams illustrating an angle change according to the first embodiment, and FIGS. 12A to 12C are state diagrams illustrating an angle change according to a second embodiment.

First, when the traveling starts, the controller 190 sets the reference line Ss in the traveling area Zd, sets an angle $\theta 1$ of the major axis Sr of the traveling pattern with respect to the reference line Ss, and starts the first the pattern traveling mode (S100).

According to the setting of the controller 190, the traveler 120 moves to the major axis Sr inclined at the corresponding traveling angle $\theta 1$ with respect to the reference line Ss, and performs the first pattern traveling mode as illustrated in FIG. 10a.

In this case, the angle of the minor axis Sv may be maintained at a fixed angle with respect to the reference line Ss regardless of the set major axis Sr, but unlike this, the direction of the minor axis Sv may be changed by the set traveling angle of the major axis Sr.

In this way, when the pattern traveling is completed up to the end point nt according to the set traveling angle $\theta 1$ in the first pattern traveling mode (S110), the controller 190 continuously sets the second pattern traveling mode (S120).

That is, the controller 190 set a traveling angle $\theta 2$ in the current pattern traveling mode, that is, the second pattern traveling mode at the angle $\theta 2$ different from the angle $\theta 1$ in the previous pattern traveling mode, that is, the angle $\theta 1$ in the first pattern traveling mode.

For example, as illustrated in FIG. 11B, the traveling angle $-\theta 1$ of the second pattern traveling mode may be set to be inclined by the same angle in an opposite direction with respect to the traveling angle $\theta 1$ of the first pattern traveling mode.

That is, respective traveling angles $\theta 1$ and $-\theta 1$ in the first pattern traveling mode and the second pattern traveling mode are set to be inclined in a positive/negative direction with respect to the reference line Ss, and thus, the traveling may be performed on the un-traveling area in the first pattern traveling mode (S130).

The angle in each of the first pattern traveling mode and the second pattern traveling mode may be 1° to 90°, and for example may be ±10°, preferably ±5°.

In this way, when third and fourth pattern traveling modes are repeatedly performed, the setting can be repeated so that the major axis Sr is inclined at the same angle in the positive direction/negative direction with respect to the reference line Ss.

When the last pattern traveling mode (S140) is completed, the controller 190 completes the traveling of the traveler 120, switches the mode to the homing mode, and performs homing to the docking device 200.

Next, the controller 190 may record the traveling for the pattern traveling mode up to n times in the storage 190 and use the record as raw data during the next traveling of the moving robot 100 (S150).

Meanwhile, the controller 190 may set the traveling angle as illustrated in FIGS. 12A and 12B.

That is, referring to FIG. 12A, the controller 190 can set the traveling angle in the first pattern traveling mode by tilting the major axis Sr in the positive direction by the first angle $\theta 1$ with respect to the reference line Ss.

An angle $\theta v$ between the minor axis Sv and the major axis Sr may be fixed or may be further changed by the first angle $\theta 1$ as described above.

In this case, in the second pattern traveling mode, the traveling angle may be set to incline the major axis Sr with respect to the reference line Ss by the second angle $\theta 2$ in the positive direction as illustrated in FIG. 12B.

The second angle $\theta 2$ is an angle inclined from the reference line Ss in the same positive direction as that of the first angle $\theta 1$, and may be an angle greater than the first angle $\theta 1$.

The angles may be between a minimum of 1° and a maximum of 90° m, and for example, the first angle $\theta 1$ may be 15°, and the second angle $\theta 2$ may be 30°.

Next, the controller 190 may set the angle of the major axis Sr with respect to the reference line Ss to the third angle $\theta 3$ in the third traveling pattern mode as illustrated in FIG. 12C. In this case, the third angle $\theta 3$ is an angle greater than the second angle $\theta 2$, and when the first angle $\theta 1$ is 15° and the second angle $\theta 2$ is 30°, the third angle $\theta 3$ may be 45°.

As described above, by performing the shifting by a predetermined angle according to each traveling pattern mode, the un-traveling area in the previous traveling pattern mode can be traveled in the current traveling pattern mode.

In this case, in the present embodiment, the shifted angle is described as 15°, but the present embodiment is not limited thereto.

Further, the present disclosure is not limited thereto, and the shifting may be performed in a manner in which an angle different from the traveling angle of the previous traveling pattern mode is randomly set.

In addition, in order to travel the traveled area with the smallest number of traveling angles up to an n-lth traveling pattern mode, the traveling angle of then traveling pattern mode may be set.

In this way, when the traveling performed in the last traveling pattern mode, by analyzing the area traveled equal to or less than a certain number of times (critical count) by summing the traveling areas up to the previous traveling pattern mode and setting the traveling angle in the last traveling pattern mode so that the moving robot travels the traveling area having a low number of times, the lawn mower robot can uniformly mow the lawn for the entire traveling area and reduce an error between traveling areas.

Hereinafter, a method of controlling a traveling angle of the controller 190 of the moving robot 100 according to another embodiment will be described.

Figure 13:
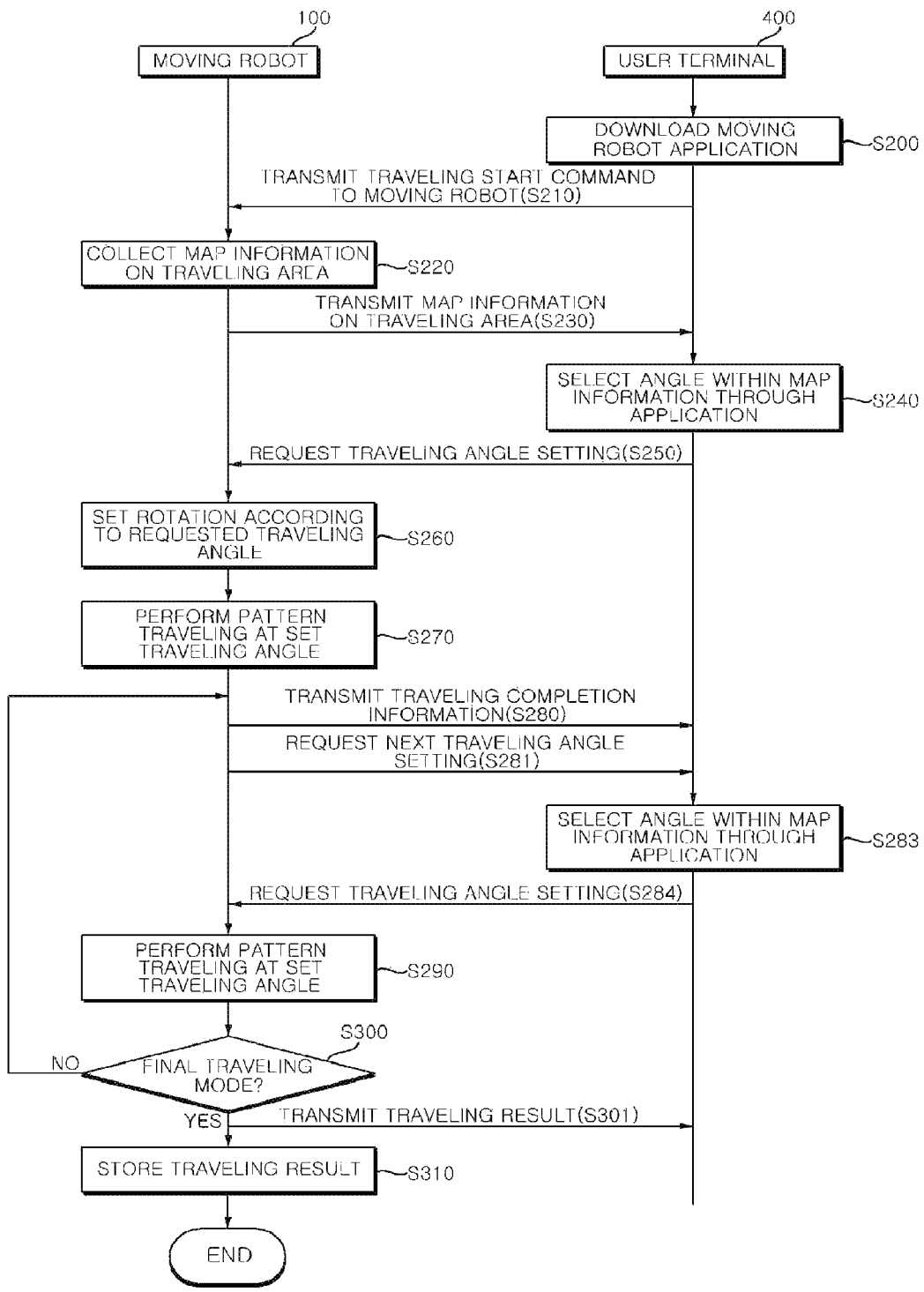
FIG. 13 is a flowchart illustrating another method of controlling a traveling angle.
Figure 14A:
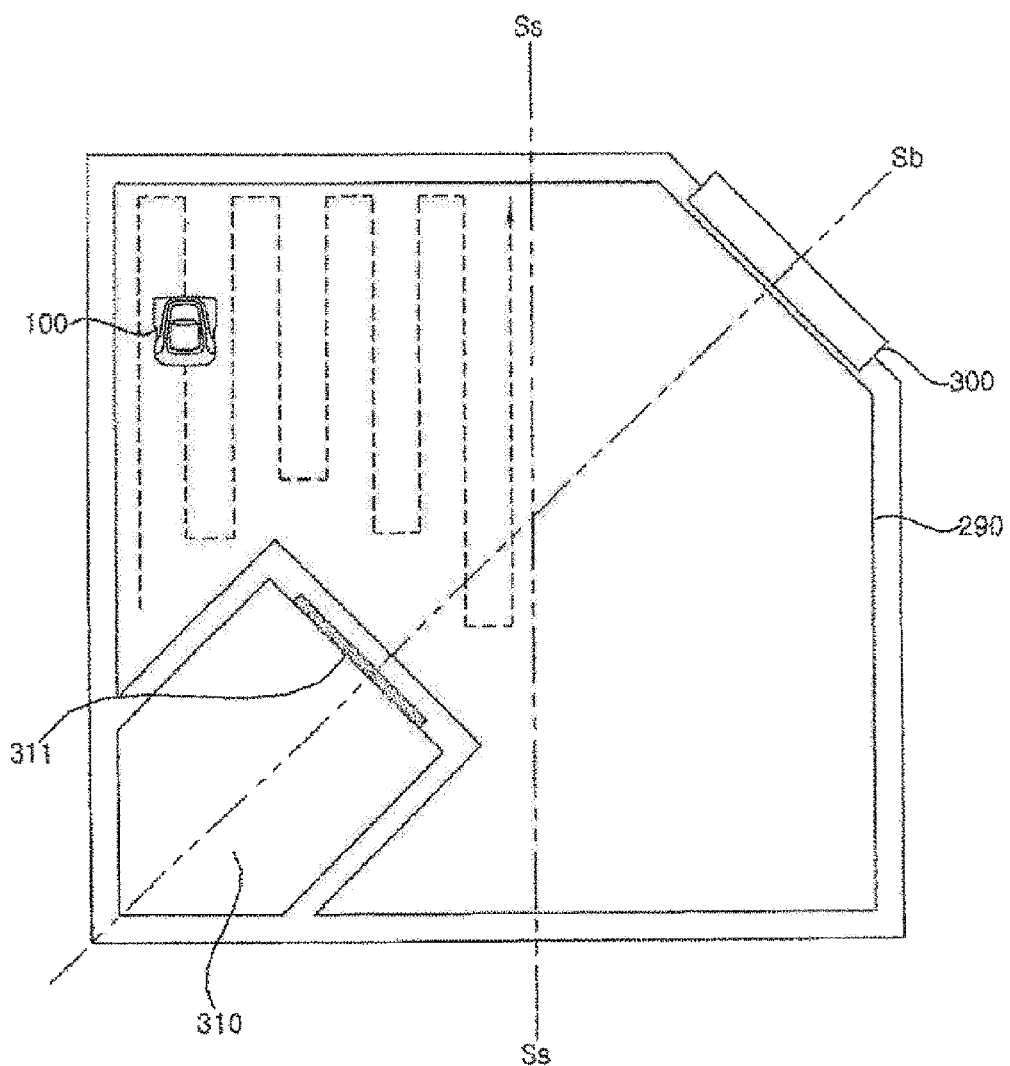
FIGS. 14A and 14B are state diagrams illustrating an angle change according to FIG. 13.
Figure 14B:
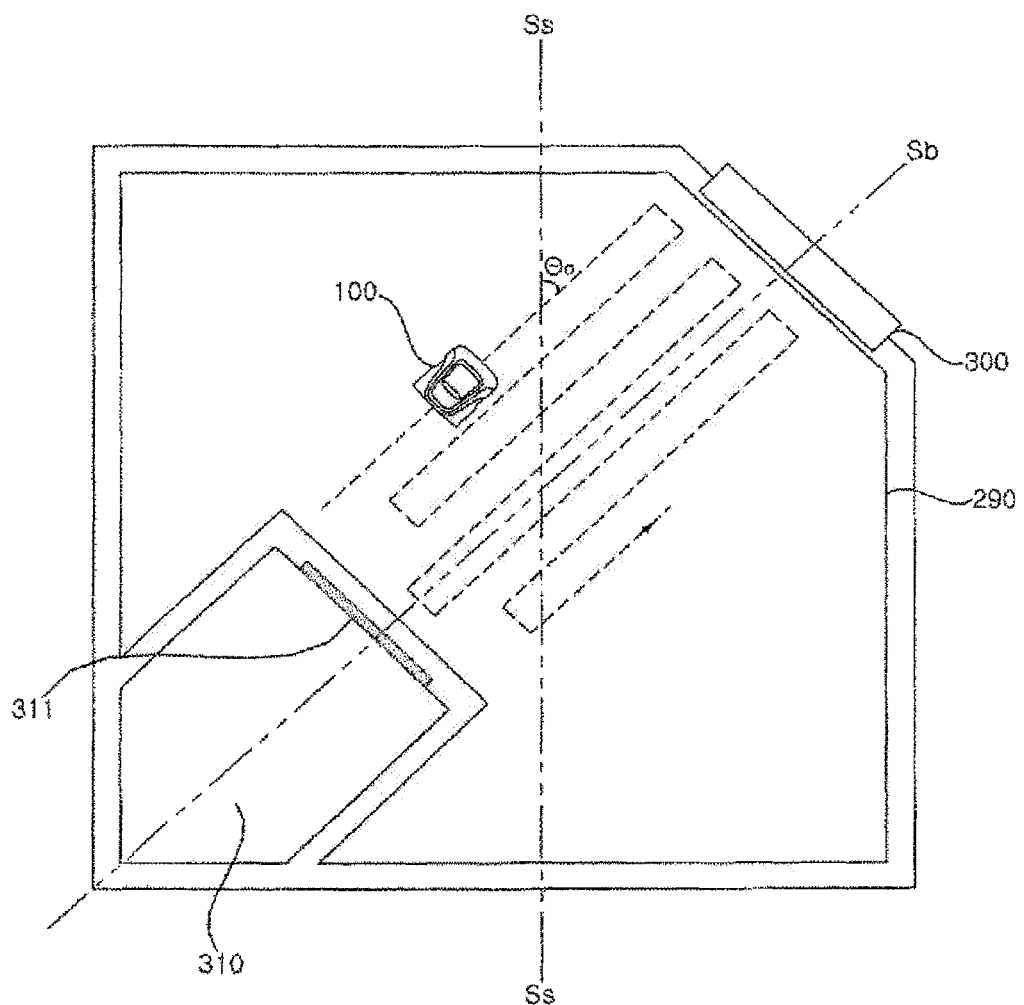

FIG. 13 is a flowchart illustrating another method of controlling the traveling angle of the moving robot 100, and FIGS. 14A and 14B are state diagrams illustrating an angle change according to FIG. 13.

The moving robot 100 system according to another embodiment of the present disclosure includes a user terminal 400 which performs transmission/reception with respect to the moving robot 100 as illustrated in FIG. 13.

The user terminal 400 may be various types of mobile communication terminals 400 capable of transmitting and receiving information to and from the moving robot 100 through a communication system and transmitting a control signal to the moving robot 100.

For example, the user terminal 400 is a mobile communication terminal 400 including a display device having a predetermined size, and may be a device such as a smartphone, a mobile phone, a tab, a notebook, and a desktop.

The user terminal 400 directly transmits a control signal for the operation of the moving robot 100, specifically a lawn mowing work, to the moving robot 100, and the moving robot 100 may adjust the corresponding traveling angle according to the control signal and perform the traveling.

In addition, the user terminal 400 may download and execute a moving robot control application capable of receiving work information on the moving robot 100 and receiving an alarm for the work information.

The user terminal 400 can receive and check information and notifications transmitted from the moving robot 100 by executing the control application of the moving robot 100, and transmit a control signal through the application.

In addition, the user terminal 400 may receive information on the moving robot 100 through SMS or a mobile messenger, and may also transmit the control signal for the moving robot 100 through the mobile messenger.

Hereinafter, it is assumed that the control application of the moving robot 100 is downloaded and installed in the user terminal 400.

First, when the user terminal 400 downloads and installs the control application of the moving robot 100 (S200), the user may register the moving robot 100 in the application.

The communicator of the moving robot 100 receives a traveling start command signal for lawn mowing through the application from the user terminal 400 (S210).

The user terminal 400 may transmit the traveling start command signal through a travel reservation for a specific time and a specific day, and may directly transmit the traveling start command signal indicating the performance of the lawn mowing at a certain time.

When the controller 190 of the moving robot 100 receives the traveling start command signal, the controller establishes map information on the traveling area Zd (S220). That is, the moving robot 100 obtains map information on the previously stored traveling area Zd, map information on the traveling area Zd obtained from the previous traveling, and a mowing schedule, and based on these, the moving robot 100 transmits map information on the current traveling area Zd to the user terminal 400 (S230).

The map information may include visual information on the traveling area Zd as illustrated in FIG. 14A.

Referring to FIG. 14A, a boundary area may be expressed with respect to the traveling area Zd, and a structure of a space in which the traveling area Zd is defined may be illustrated together.

That is, an indoor space bordered by the traveling area Zd, a main door, a flower bed, and other structures around the traveling area Zd may be illustrated, and in the structures, a door or window may be specifically illustrated.

FIG. 14A illustrates a shape in which a window 311 and a main door 300 of an indoor space 310 face each other with respect to the traveling area Zd, and, in this way, a visual reference line Sb crossing between the window 311 and the main door 300 is separately illustrated.

This visual reference line Sb may be set to a different angle from the reference line Ss on the traveling area Zd.

As illustrated in FIG. 14A, in the first traveling pattern mode, a traveling angle parallel to the reference line Ss may be provided to the user terminal 400 as a default.

The user terminal 400 may set the traveling angle in relation to the traveling pattern of the moving robot 100 in the received traveling map (S240).

That is, the user terminal 400 may simulate a traveling pattern at the changed angle while changing the corresponding traveling angle.

In this way, when a specific traveling angle is selected through the user terminal 400, the moving robot 100 receives a traveling angle setting request signal from the user terminal 400 (S250).

The controller 190 changes the traveling angle of the traveler 120 according to the traveling angle of the received traveling angle setting request signal (S260).

This traveling angle θ0 may be set to an angle parallel to the visual reference line Ss as illustrated in FIG. 14B.

That is, when the user looks at the traveling area Zd through a window in an indoor area where the user with the user terminal 400 mainly lives, it is possible to set the major axis Sr parallel to the visual reference line Ss, which is an angle that can be seen as the moving robot 100 performs the lawn mowing work in a uniform pattern.

When the major axis Sr is set as described above, when the zigzag mode in which the moving robot 100 is operated is viewed from the inner space through the window, it can be seen that the moving robot travels in a certain direction toward the main door.

Accordingly, the moving robot 100 is seen to move regularly in a field of view of the user, and thus, it is possible to reduce a discomfort of the user.

Next, the controller 190 of the moving robot 100 sets the angle of the traveler 120 to the set traveling angle and proceeds to the first pattern traveling mode (S270).

In this way, when the first pattern traveling mode is performed and the moving robot 100 proceeds to the end point, the controller 190 transmits traveling completion information to the user terminal 400 (S280). In this case, the controller 190 may also request a request for setting the next traveling angle (S281).

The user terminal 400 may receive a request for completing traveling in the first pattern traveling mode and setting a traveling angle for the next pattern traveling mode, and set a new angle through the application (S283).

When the traveling angle setting request signal for the next pattern traveling mode is received from the user terminal 400 (S284), the controller 190 performs the pattern traveling at the set traveling angle, and repeats this operation (S290).

In this case, it is determined whether this pattern traveling mode is the last pattern traveling mode (S300), and in a case where this pattern traveling mode is the last pattern traveling mode, the controller 190 transmits a traveling result to the user terminal 400 (S301).

In this case, the traveling result may include statistical information on a height of the lawn mowed in each area according to the execution of the pattern traveling mode performed a plurality of times.

The controller 190 may store the traveling result in the storage 190 and use the traveling result as raw data for the next traveling (S310).

In this way, the moving robot 100 may receive a setting signal for a specific traveling angle from the user terminal 400 and set the traveling angle to the corresponding angle to perform the traveling.

What is claimed is:

1. A moving robot system comprising:
a moving robot generating map information of a traveling area when driving within a boundary region of the traveling area, and mowing grass of a predetermined length for each one-time pattern traveling in the traveling area, wherein the one-time pattern traveling includes traveling the entire traveling area in a zigzag pattern while maintaining a specific traveling angle; and
a user terminal including a control application for the moving robot, receiving the map information of the traveling area from the moving robot, executing the control application to visualize the map information for the travelling area having structure for the travelling area and a visual reference line connecting a window and a door of the travelling area and setting the traveling angle of each time pattern traveling of the moving robot according to the visual reference line, and transmitting it to the moving robot,
wherein the moving robot receives the traveling angle for each pattern traveling from the user terminal when the moving robot travels in an n-time pattern traveling of the traveling area, and changes the traveling angle accordingly to complete the traveling.

2. The moving robot system of claim 1, wherein the moving robot controls a traveler so that the traveler performs pattern traveling in the zigzag pattern in which the moving robot alternately travels a major axis and a minor axis.

3. The moving robot system of claim 2, wherein the moving robot defines an angle of the major axis with respect to a reference line of the traveling area as the traveling angle, and angles of a first pattern traveling and a second pattern traveling are different from each other.

4. The moving robot system of claim 3, wherein the user terminal sets the traveling angle so that the major axis is parallel to the visual reference line so that the moving robot travels and transmits a setting angle to the moving robot.

5. The moving robot system of claim 3, wherein the moving robot transmits a request signal for requesting the travel angle of a next time to the user terminal when the first pattern traveling for the travel area is completed.

6. The moving robot system of claim 5, when the n-time pattern traveling of the traveling is completed, the moving robot provides statistical information on a length of cut grass for each region within the traveling area to the user terminal.

7. The moving robot system of claim 3, wherein the moving robot sets angles of the minor axis and the major axis according to the traveling angle of a new major axis.

8. The moving robot system of claim 3, wherein the moving robot sets the traveling angle so that, during a last pattern traveling, the moving robot travels an area, in which the moving robot travels equal to or less than a critical count, of traveling areas up to a previous pattern traveling.

9. The moving robot system of claim 3, further comprising a boundary wire which defines the traveling area.

10. The moving robot system of claim 9, wherein the moving robot includes:
a body which forms an appearance;
the traveler which moves the body;
a boundary signal detector which detects a boundary signal generated in a boundary area of a traveling area; and
a controller which controls the traveler so that the traveler performs pattern traveling a plurality of times in the traveling area.

11. The moving robot system of claim 10, further comprising:
a docking device to which the moving robot is docked to be charged,
wherein one end of the boundary area is disposed to be adjacent to the docking device.

12. The moving robot system of claim 11, wherein the docking device further includes a first wire terminal and a second wire terminal connected to a power source, and
wherein one end of the boundary wire is connected to the first wire terminal and a second end of the boundary wire is connected to the second wire terminal.

* * * * *